United States Patent
Nishigaki et al.

(10) Patent No.: US 8,419,195 B2
(45) Date of Patent: Apr. 16, 2013

(54) PROJECTOR

(75) Inventors: Hiroshi Nishigaki, Daito (JP); Atsuya Hirano, Daito (JP); Atsuhiko Chikaoka, Daito (JP); Ken Nishioka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 198 days.

(21) Appl. No.: 12/827,436

(22) Filed: Jun. 30, 2010

(65) Prior Publication Data
US 2011/0102751 A1 May 5, 2011

(30) Foreign Application Priority Data
Jul. 1, 2009 (JP) .................................. 2009-156528

(51) Int. Cl.
*G03B 21/28* (2006.01)
(52) U.S. Cl.
USPC ............... 353/99; 353/31; 353/85; 353/94; 353/98; 353/122; 359/204.1; 372/24
(58) Field of Classification Search .................. 353/20, 353/30, 31, 37, 38, 85, 94, 98, 99, 122; 348/195, 348/201, 166, 746, 747, 771, 756, E9.026; 359/17, 27, 204.1, 196.1, 197.1, 199.1, 618, 359/629, 201.1, 201.2, 202.1, 204.4
See application file for complete search history.

(56) References Cited

U.S. PATENT DOCUMENTS

| | | | | |
|---|---|---|---|---|
| 5,731,888 A * | 3/1998 | Arai | ............................ | 359/204.1 |
| 6,128,131 A * | 10/2000 | Tang | .............................. | 359/443 |
| 6,755,536 B2 * | 6/2004 | Tegreene et al. | ................ | 353/94 |
| 7,252,394 B1 * | 8/2007 | Fu | ..................................... | 353/98 |
| 7,423,787 B2 | 9/2008 | Nakajima | | |
| 7,675,013 B2 * | 3/2010 | Kobayashi et al. | ............ | 250/205 |
| 2004/0239818 A1 | 12/2004 | Sugiyama et al. | | |
| 2005/0057727 A1 * | 3/2005 | Troyer | .............................. | 353/31 |
| 2006/0119804 A1 * | 6/2006 | Dvorkis et al. | .................. | 353/98 |
| 2006/0209374 A1 * | 9/2006 | Willemsen | ...................... | 359/205 |
| 2007/0273843 A1 * | 11/2007 | Stern et al. | ...................... | 353/98 |
| 2008/0094676 A1 * | 4/2008 | Lach et al. | ...................... | 359/196 |
| 2008/0112028 A1 * | 5/2008 | Peterson | ....................... | 359/204 |
| 2009/0096994 A1 * | 4/2009 | Smits | .............................. | 353/30 |
| 2010/0177285 A1 | 7/2010 | Sakakibara | | |
| 2010/0302511 A1 * | 12/2010 | Kang et al. | ...................... | 353/31 |

FOREIGN PATENT DOCUMENTS

| | | |
|---|---|---|
| JP | 2001-30537 A | 2/2001 |
| JP | 2002-296677 A | 10/2002 |
| JP | 2002-341285 A | 11/2002 |
| JP | 2004-279943 A | 10/2004 |
| JP | 2009-086366 A | 4/2009 |

* cited by examiner

*Primary Examiner* — Georgia Y Epps
*Assistant Examiner* — Sultan Chowdhury
(74) *Attorney, Agent, or Firm* — Crowell & Moring LLP

(57) ABSTRACT

This projector includes a laser beam emitting portion emitting a laser beam and a projecting portion projecting an image on an arbitrary projection region by scanning the projection region with the laser beam. This projector further includes a control portion controlling the laser beam emitting portion not to emit the laser beam by stopping supplying current to the laser beam emitting portion in a previously set partial scanning section within a scanning section for the laser beam.

21 Claims, 10 Drawing Sheets

PROJECTOR

BACKGROUND OF THE INVENTION

1. Field of the Invention

The present invention relates to a projector, and more particularly, it relates to a projector including a laser beam emitting portion.

2. Description of the Background Art

A projector or the like including a laser beam emitting portion is known in general, as disclosed in each of Japanese Patent Laying-Open Nos. 2004-279943, 2002-341285, 2002-296677 and 2001-30537, for example.

The aforementioned Japanese Patent Laying-Open No. 2004-279943 discloses an image display including laser beam output means constituted of a plurality of laser beam emitting portions outputting laser beams and a control portion reducing power consumption by stopping the laser output of a partial laser beam emitting portion included in the plurality of laser beam emitting portions thereby lowering brightness of light.

The aforementioned Japanese Patent Laying-Open No. 2002-341285 discloses an optical scanner including a laser diode generating an optical beam, a movable mirror for scanning an object with the optical beam emitted from the laser diode, an electrode driving portion for driving the movable mirror, a synchronous sensor detecting the optical beam and outputting a synchronous detection signal and a terminal sensor detecting the optical beam on a scanning terminal. The optical scanner disclosed in the aforementioned Japanese Patent Laying-Open No. 2002-341285 is formed to time the scanning with the optical beam on the basis of the synchronous detection signal. Further, the optical scanner disclosed in the aforementioned Japanese Patent Laying-Open No. 2002-341285 is formed to determine that the movable mirror does not correctly scan the object with the optical beam and to stop supplying current to the laser diode when no detection signals are obtained from the synchronous sensor and the terminal sensor even if a voltage applied to the electrode driving portion exceeds a prescribed value in a state where the laser diode is turned on.

The aforementioned Japanese Patent Laying-Open No. 2002-296677 discloses an optical scanning type projector including a laser source emitting three laser beams, i.e., red, green and blue laser beams, an optical modulator modulating the laser beams, a horizontal optical chopper for partially blocking the laser beams modulated in the optical modulator, a polygonal mirror horizontally scanning a screen with the laser beams received from the horizontal optical chopper and a galvanomirror displaying an image on the screen by vertically scanning the screen with the laser beams employed for horizontally scanning the screen through the polygonal mirror. The optical scanning type projector disclosed in the aforementioned Japanese Patent Laying-Open No. 2002-296677 is formed to highlight boundaries between pixels in the image displayed on the screen by blocking the laser beams to separate adjacent pixels from each other in the horizontal optical chopper.

The aforementioned Japanese Patent Laying-Open No. 2001-30537 discloses an optical scanner including a semiconductor laser emitting a laser beam, a rotary polyhedral mirror for scanning an object with the laser beam emitted from the semiconductor laser and an optical detector detecting pass timing of the laser beam scanning the object. The optical scanner disclosed in the aforementioned Japanese Patent Laying-Open No. 2001-30537 is so formed, when there is deviation between the pass timing of the laser beam detected by the optical detector and image information, as to correct the deviation by deleting or adding data of the image information on the position where the deviation is present. This optical scanner is formed to emit the laser beam or to stop emitting the laser beam on the basis of the image information by varying optical output of the semiconductor laser beam.

However, the image display described in the aforementioned Japanese Patent Laying-Open No. 2004-279943 stops the laser output from the partial laser beam emitting portion included in the plurality of laser beam emitting portions while the remaining laser beam emitting portions continuously output the laser beams, and hence the temperature is disadvantageously easily increased in the remaining laser beam emitting portions continuously outputting the laser beams. Therefore, luminous efficiency (optical output with respect to current) is disadvantageously reduced in the laser beam emitting portions continuously outputting the laser beams, due to the increase in the temperature.

The optical scanner described in the aforementioned Japanese Patent Laying-Open No. 2002-341285 stops supplying current to the laser diode in an abnormal state of determining that the movable mirror does not correctly scan the object with the optical beam, and does not stop supplying the current to the laser diode in a normal state of determining that the movable mirror correctly scans the object with the optical beam. Therefore, it is conceivable that the laser diode regularly continuously emits the optical beam while the normal state continues. In this case, however, the temperature is disadvantageously easily increased in the laser diode. Therefore, luminous efficiency of the laser diode is disadvantageously reduced due to the increase in the temperature.

The optical scanning type projector described in the aforementioned Japanese Patent Laying-Open No. 2002-296677 blocks the laser beams to separate adjacent pixels from each other in the horizontal optical chopper, while the laser source emits the laser beams continuously, and hence the temperature is disadvantageously easily increased in the laser source. Therefore, luminous efficiency is disadvantageously reduced in the laser source, due to the increase in the temperature.

The optical scanner described in the aforementioned Japanese Patent Laying-Open No. 2001-30537 may conceivably stop emission of the laser beam on the basis of the image information, while the semiconductor laser may continuously emit the laser beam depending on the image information. In this case, the temperature is disadvantageously easily increased in the semiconductor laser. Therefore, luminous efficiency of the semiconductor laser is disadvantageously reduced due to the increase in the temperature.

SUMMARY OF THE INVENTION

The present invention has been proposed in order to solve the aforementioned problems, and an object of the present invention is to provide a projector capable of suppressing reduction in luminous efficiency of a laser beam emitting portion resulting from temperature rise.

In order to attain the aforementioned object, a projector according to an aspect of the present invention includes a laser beam emitting portion emitting a laser beam, a projecting portion projecting an image on an arbitrary projection region by scanning the projection region with the laser beam and a control portion controlling the laser beam emitting portion not to emit the laser beam by stopping supplying current to the laser beam emitting portion in a previously set partial scanning section within a scanning section for the laser beam.

In the projector according to the aspect, as hereinabove described, the control portion controls the laser beam emitting portion not to emit the laser beam by stopping supplying the current to the laser beam emitting portion in the previously set partial scanning section within the scanning section for the laser beam so that the laser beam emitting portion is previously set not to emit the laser beam in the partial scanning section dissimilarly to a case of controlling emission and stoppage of the laser beam on the basis of image information or an abnormal state of the projecting portion, whereby the laser beam emitting portion can be reliably inhibited from continuously emitting the laser beam. Further, the laser beam emitting portion is previously set not to emit the laser beam in the partial scanning section, whereby the same can outwardly discharge heat, generated by the emission of the laser beam, in the scanning section for not emitting the laser beam. Thus, temperature rise in the laser beam emitting portion can be suppressed, thereby suppressing reduction in luminous efficiency of the laser beam emitting portion resulting from temperature rise.

In general, the laser beam emitting portion does not emit the laser beam when the current supplied thereto is less than a prescribed emission threshold, and hence current exceeding the emission threshold must be fed also in a case of reducing brightness of the laser beam. Under such circumstances, the projector according to the present invention stops supplying the current to the laser beam emitting portion so that the same may not continuously feed the current exceeding the emission threshold to the laser beam emitting portion dissimilarly to a case where the projector is formed to reduce power consumption by reducing brightness of the laser beam while scanning an object with the laser beam entirely through the scanning section, whereby power consumption can be further reduced.

In the projector according to the aforementioned aspect, the scanning section preferably includes a reciprocatory scanning section constituted of a forward path and a backward path, and the control portion is preferably formed to control the laser beam emitting portion not to emit the laser beam by stopping supplying the current to the laser beam emitting portion in the previously set partial scanning section of at least either the forward path or the backward path of the reciprocatory scanning section. According to this structure, reduction in luminous efficiency of the laser beam emitting portion can be suppressed in the projector employing the projecting portion capable of scanning the forward path and the backward path.

In this case, the control portion is preferably formed to control the laser beam emitting portion not to emit the laser beam by stopping supplying the current to the laser beam emitting portion in both of the previously set partial scanning section of the forward path and the previously set partial scanning section of the backward path. According to this structure, the laser beam emitting portion can be further inhibited from continuously emitting the laser beam and can outwardly discharge the heat in both of the partial scanning section of the forward path and the partial scanning section of the backward path, whereby temperature rise in the laser beam emitting portion can be further suppressed.

In the aforementioned projector controlling the laser beam emitting portion not to emit the laser beam in both of the partial scanning section of the forward path and the partial scanning section of the backward path, the length of the previously set partial scanning section of the forward path and the length of the previously set partial scanning section of the backward path are preferably substantially half the length of the forward path and substantially half the length of the backward path respectively. According to this structure, the laser beam emitting portion can outwardly discharge the heat in both of the partial scanning section of the forward path whose length is substantially half the length of the forward path and the partial scanning section of the backward path whose length is substantially half the length of the backward path, whereby temperature rise in the laser beam emitting portion can be effectively suppressed.

In the aforementioned projector having the scanning section including the reciprocatory scanning section, the scanning section preferably includes a plurality of reciprocatory scanning sections, and the control portion is preferably formed to control the laser beam emitting portion not to emit the laser beam by stopping supplying the current to the laser beam emitting portion in the previously set partial scanning section of at least either the forward path or the backward path in each of the plurality of reciprocatory scanning sections. According to this structure, the laser beam emitting portion can be reliably inhibited from continuously emitting the laser beam in each of the plurality of reciprocatory scanning sections, and can outwardly discharge the heat, generated by the emission of the laser beam, in the scanning section for not emitting the laser beam. Thus, reduction in the luminous efficiency of the laser beam emitting portion can be further suppressed.

In the aforementioned projector having the scanning section including the plurality of reciprocatory scanning sections, the control portion is preferably formed to control the laser beam emitting portion not to emit the laser beam by stopping supplying the current to the laser beam emitting portion in both of the previously set partial scanning section of the forward path and the previously set partial scanning section of the backward path in each of the plurality of reciprocatory scanning sections. According to this structure, the laser beam emitting portion can be further inhibited from continuously emitting the laser beam in each of the plurality of reciprocatory scanning sections. Further, the laser beam emitting portion can outwardly discharge the heat in both of the partial scanning section of the forward path and the partial scanning section of the backward path, whereby temperature rise in the laser beam emitting portion can be further suppressed.

In the aforementioned projector controlling the laser beam emitting portion not to emit the laser beam in both of the partial scanning section of the forward path and the partial scanning section of the backward path, the length of the previously set partial scanning section of the forward path and the length of the previously set partial scanning section of the backward path are preferably substantially half the length of the forward path and substantially half the length of the backward path respectively in each of the plurality of reciprocatory scanning sections. According to this structure, the laser beam emitting portion can outwardly discharge the heat in both of the partial scanning section of the forward path whose length is substantially half the length of the forward path and the partial scanning section of the backward path whose length is substantially half the length of the backward path in each of the plurality of reciprocatory scanning sections, whereby temperature rise in the laser beam emitting portion can be effectively suppressed.

In the aforementioned projector having the scanning section including the reciprocatory scanning section, the control portion is preferably formed to switch a scanning section for emitting the laser beam and a scanning section for not emitting the laser beam in each of the forward path and the backward path at least through a centerline passing through a substantially central portion of the projection region and substantially orthogonal to the forward path and the backward path. According to this structure, the control portion can switch the scanning section for emitting the laser beam and the scanning section for not emitting the laser beam at least substantially in the middle of the forward path and substantially in the middle of the backward path, whereby the laser beam emitting portion can be reliably inhibited from continuously emitting the laser beam and can outwardly discharge the heat, generated by the emission of the laser beam, in the scanning section for not emitting the laser beam.

In the aforementioned projector having the scanning section including the reciprocatory scanning section, the control portion is preferably formed to switch a scanning section for emitting the laser beam and a scanning section for not emitting the laser beam on a plurality of portions in at least either the forward path or the backward path of the reciprocatory scanning section. According to this structure, the laser beam emitting portion can be further reliably inhibited from continuously emitting the laser beam in at least either the forward path or the backward path of the reciprocatory scanning section.

In the aforementioned projector switching the scanning section for emitting the laser beam and the scanning section for not emitting the laser beam in the plurality of portions, the length of the scanning section for emitting the laser beam and the length of the scanning section for not emitting the laser beam are preferably substantially identical to each other in at least either the forward path or the backward path of the reciprocatory scanning section. According to this structure, the scanning section for not emitting the laser beam is so sufficiently ensured that the laser beam emitting portion can sufficiently outwardly discharge the heat. Thus, temperature rise in the laser beam emitting portion can be effectively suppressed.

In the aforementioned projector having the scanning section including the reciprocatory scanning section, the control portion is preferably formed to switch a scanning section for controlling the laser beam emitting portion to emit the laser beam and a scanning section for controlling the laser beam emitting portion not to emit the laser beam in the vicinity of an end portion of the projection region which is the boundary between the forward path and the backward path so that either the forward path or the backward path is the scanning section for emitting the laser beam and either the backward path or the forward path is the scanning section for not emitting the laser beam. According to this structure, the laser beam emitting portion can be reliably inhibited from continuously emitting the laser beam, and can outwardly discharge the heat, generated in either the forward path or the backward path, in either the backward path or the forward path. Thus, temperature rise in the laser beam emitting portion can be so suppressed that reduction in the luminous efficiency of the laser beam emitting portion resulting from temperature rise can be suppressed.

The projector according to the aforementioned aspect preferably further includes a projector body including the laser beam emitting portion, the projecting portion and the control portion, and the projector body preferably consists of a portable projector body carried by a user. According to this structure, power consumption in the projector body is so reduced that the user can use the projector over a long period of time even if the portable projector is driven by a battery.

In this case, the portable projector body is preferably driven by a battery. According to this structure, power consumption in the projector body is so reduced that the user can use the projector over a long period of time also when the projector body is driven by the battery.

In the projector according to the aforementioned aspect, the projecting portion is preferably formed to project the image on the projection region by repetitively scanning the projection region with the laser beam at a prescribed time interval, the control portion is preferably formed to control the laser beam emitting portion not to emit the laser beam by stopping supplying the current to the laser beam emitting portion in the previously set partial scanning section within the scanning section for the laser beam in first scanning, and formed to control the laser beam emitting portion to emit the laser beam by supplying the current to the laser beam emitting portion in the scanning section, in which the control portion has controlled the laser beam emitting portion not to emit the laser beam in the first scanning, and to control the laser beam emitting portion not to emit the laser beam by stopping supplying the current to the laser beam emitting portion in a scanning section different from the scanning section, in which the control portion has controlled the laser beam emitting portion not to emit the laser beam, in second scanning for scanning the same scanning section as that scanned in the first scanning subsequently to the first scanning, and the control portion is preferably formed to repeat the first scanning and the second scanning. According to this structure, it is possible to compensate for the scanning section, in which the control portion has controlled the laser beam emitting portion not to emit the laser beam in the first scanning, by controlling the laser beam emitting portion to emit the laser beam in the second scanning for scanning the same scanning section as that scanned in the first scanning subsequently to the first scanning. Thus, the image projected on the projection region can be prevented from reduction in resolution resulting from the presence of the scanning section in which the control portion has controlled the laser beam emitting portion not to emit the laser beam. Further, the control portion is formed to control the laser beam emitting portion not to emit the laser beam by stopping supplying the current to the laser beam emitting portion in the scanning section different from the scanning section in which the control portion has controlled the laser beam emitting portion not to emit the laser beam in the second scanning for scanning the projection region in the same scanning section as that scanned in the first scanning subsequently to the first scanning, whereby the laser beam emitting portion can be inhibited from continuously emitting the laser beam and can outwardly discharge the heat, generated by the emission of the laser beam, in the scanning section different from the scanning section in which the control portion has controlled the laser beam emitting portion not to emit the laser beam.

In the aforementioned projector repeating the first scanning and the second scanning, the projecting portion is preferably formed to project the image on the projection region by repetitively scanning the same scanning section with the laser beam, and the control portion is preferably formed to control the laser beam emitting portion not to emit the laser beam in the previously set partial scanning section within the scanning section for the laser beam in first-time scanning as the first scanning, and formed to control the laser beam emitting portion to emit the laser beam in the scanning section, in which the control portion has controlled the laser beam emitting not to emit the laser beam in the first-time scanning, and to control the laser beam emitting portion not to emit the laser beam in a scanning section different from the scanning section, in which the control portion has controlled the laser beam emitting not to emit the laser beam, in second-time scanning as the second scanning. According to this structure, it is possible to compensate the scanning section, in which the control portion has controlled the laser beam emitting portion not to emit the laser beam in the first scanning, by controlling the laser beam emitting portion to emit the laser beam in the subsequent second-time scanning in a progressive system of repetitively scanning the same scanning section for the laser beam. Thus, the image projected on the projection region can be further reliably prevented from reduction in resolution resulting from the presence of the scanning section in which the control portion has controlled the laser beam emitting portion not to emit the laser beam. Further, the control portion is formed to control the laser beam emitting portion not to emit the laser beam in the scanning section different from the scanning section, in which the control portion has controlled the laser beam emitting portion not to emit the laser beam, in the second-time scanning, whereby the laser beam emitting portion can be inhibited from continuously emitting the laser beam and can outwardly discharge the heat, generated by the emission of the laser beam, in the scanning section different from the scanning section in which the control portion has controlled the laser beam emitting portion not to emit the laser beam.

In the aforementioned projector repetitively scanning the same scanning section for the laser beam, the control portion is preferably formed to control the laser beam emitting portion not to emit the laser beam in the previously set partial scanning section within the scanning section for the laser beam in odd-time scanning as the first scanning, and formed to control the laser beam emitting portion to emit the laser beam in the scanning section, in which the control portion has controlled the laser beam emitting portion not to emit the laser beam in the odd-time scanning, and to control the laser beam emitting portion not to emit the laser beam in a scanning section different from the scanning section, in which the control portion has controlled the laser beam emitting portion not to emit the laser beam, in even-time scanning as the second scanning. According to this structure, it is possible to compensate for the scanning section, in which the control portion has controlled the laser beam emitting portion not to emit the laser beam in the odd-time scanning, by controlling the laser beam emitting portion to emit the laser beam in the subsequent even-time scanning in the progressive system of repetitively scanning the same scanning section for the laser beam. Thus, the image projected on the projection region can be further reliably prevented from reduction in resolution resulting from the presence of the scanning section in which the control portion has controlled the laser beam emitting portion not to emit the laser beam. Further, the control portion is formed to control the laser beam emitting portion not to emit the laser beam in the scanning section different from the scanning section in which the control portion has controlled the laser beam emitting portion not to emit the laser beam in the even-time scanning, whereby the laser beam emitting portion can be inhibited from continuously emitting the laser beam and can outwardly discharge the heat, generated by the emission of the laser beam, in the scanning section different from the scanning section in which the control portion has controlled the laser beam emitting portion not to emit the laser beam.

In the aforementioned projector repeating the first scanning and the second scanning, the scanning section is preferably constituted of a first scanning section corresponding to a prescribed region in the projection region and a second scanning section corresponding to a region, different from the first scanning section, in the projection region, the projecting portion is preferably formed to project the image on the projection region by repeating an operation of scanning the first scanning section and the second scanning section as a set, and the control portion is preferably formed to control the laser beam emitting portion not to emit the laser beam in a previously set partial scanning section within the first scanning section for the laser beam in first-time scanning as the first scanning, formed to control the laser beam emitting portion not to emit the laser beam in a previously set partial scanning section within the second scanning section for the laser beam in second-time scanning as the second scanning, formed to control the laser beam emitting portion to emit the laser beam in the scanning section, in which the control portion has controlled the laser beam emitting portion not to emit the laser beam in the first-time scanning, and to control the laser beam emitting portion not to emit the laser beam in a scanning section different from the scanning section, in which the control portion has controlled the laser beam emitting portion not to emit the laser beam, in third-time scanning as the second scanning, and formed to control the laser beam emitting portion to emit the laser beam in the scanning section, in which the control portion has controlled the laser beam emitting portion not to emit the laser beam in the second-time scanning, and to control the laser beam emitting portion not to emit the laser beam in a scanning section different from the scanning section, in which the control portion has controlled the laser beam emitting portion not to emit the laser beam, in fourth-time scanning as the second scanning, in a case of alternately repeating scanning of the first scanning section and scanning of the second scanning section. According to this structure, it is possible to compensate for the partial scanning section in the first scanning section, in which the control portion has controlled the laser beam emitting portion not to emit the laser beam in the first-time scanning, by controlling the laser beam emitting portion to emit the laser beam in the third-time scanning subsequently scanning the first scanning section in an interlace system of repeating operation of scanning the first scanning section and the second scanning section as a set. Further, it is possible to compensate for the partial scanning section in the second scanning section, in which the control portion has controlled the laser beam emitting portion not to emit the laser beam in the second-time scanning, by controlling the laser beam emitting portion to emit the laser beam in the fourth-time scanning subsequently scanning the second scanning section. Thus, the image projected on the projection region can be further prevented from reduction in resolution resulting from the presence of the scanning section in which the control portion has controlled the laser beam emitting portion not to emit the laser beam. In addition, the control portion is formed to control the laser beam emitting portion not to emit the laser beam in the scanning section different from the scanning section, in which the control portion has controlled the laser beam emitting portion not to emit the laser beam, in each of the third-time scanning and the fourth-time scanning, whereby the laser beam emitting portion can be inhibited from continuously emitting the laser beam and can outwardly discharge the heat, generated by the emission of the laser beam, in the scanning section different from the scanning section in which the control portion has controlled the laser beam emitting portion not to emit the laser beam.

In the projector according to the aforementioned aspect, the control portion is preferably formed to vary the number of scanning sections for stopping supplying the current to the laser beam emitting portion and to vary the length of each scanning section in which the control portion has stopped supplying the current, in response to the magnitude of the current supplied to the laser beam emitting portion. According to this structure, the projector can project the image on the projection region while properly suppressing both of temperature rise in the laser beam emitting portion resulting from the emission of the laser beam and reduction in resolution of the image projected on the projection region resulting from nonemission of the laser beam.

In this case, the control portion is preferably formed to increase the number of the scanning sections for stopping supplying the current to the laser beam emitting portion and to reduce the length of each scanning section, in which the control portion has stopped supplying the current, when such a state that the value of the current supplied to the laser beam emitting portion is larger than a prescribed current value continues for a prescribed period. According to this structure, temperature rise in the laser beam emitting portion resulting from continuous emission of the laser beam can be further suppressed by increasing the number of the scanning section in which the control portion stops supplying the current to the laser beam emitting portion when the temperature in the laser beam emitting portion is easily increased due to continuation of the state that the value of the current supplied to the laser beam emitting portion is larger than the prescribed current value. Further, the length of the scanning section in which the control portion has stopped supplying the current to the laser beam emitting portion is so reduced that the image projected on the projection region can be prevented from reduction in resolution resulting from nonemission of the laser beam.

In the projector according to the aforementioned aspect, the laser beam emitting portion preferably includes a red laser beam emitting portion emitting a red laser beam, a blue laser beam emitting portion emitting a blue laser beam and a green laser beam emitting portion emitting a green laser beam, and the control portion is preferably formed to control the red laser beam emitting portion, the blue laser beam emitting portion and the green laser beam emitting portion not to emit the red laser beam, the blue laser beam and the green laser beam respectively by stopping supplying the current to each of the red laser beam emitting portion, the blue laser beam emitting portion and the green laser beam emitting portion in the previously set partial scanning section. The projector including the laser beam emitting portion consisting of the red laser beam emitting portion, the blue laser beam emitting portion and the green laser beam emitting portion is so applied to the present invention that a color-displayable projector capable of suppressing reduction in luminous efficiency of a laser beam emitting portion resulting from temperature rise can be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

The structure of a portable projector 1 according to a first embodiment of the present invention is described with reference to FIGS. 1 to 8. The portable projector 1 is an example of the "projector" in the present invention. In the first embodiment, the present invention is applied to the portable projector 1 of a progressive system.

Figure 1:
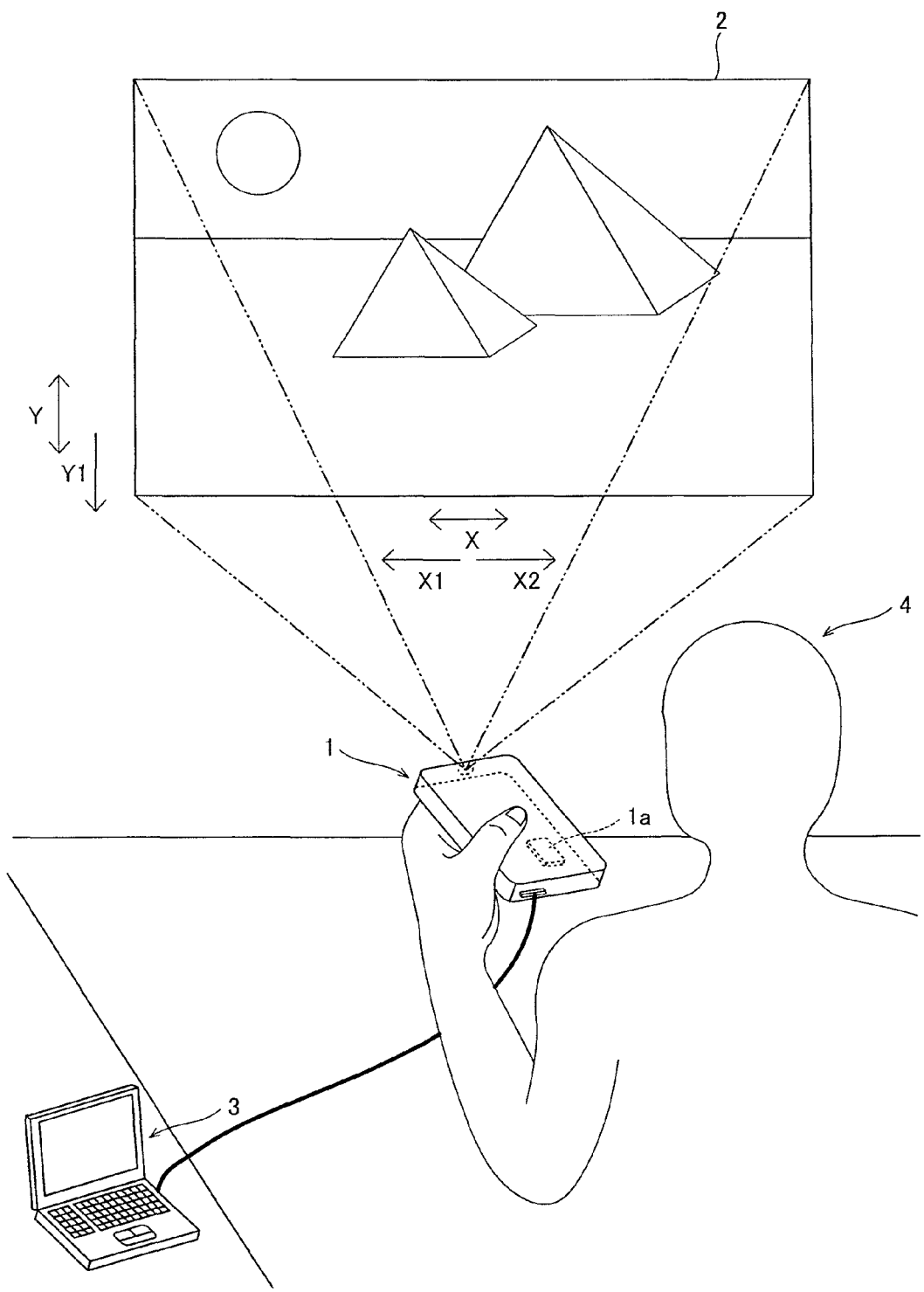
FIG. 1 illustrates a used state of a portable projector according to a first embodiment of the present invention.

The portable projector 1 according to the first embodiment of the present invention is formed to project three laser beams, i.e., red, green and blue laser beams (RGB laser beams) on a projection region 2 consisting of an X-Y plane, as shown in FIG. 1. The portable projector 1 is formed to scan the projection region 2 with the RGB laser beams at this time, so that a color image can be projected on the projection region 2. The portable projector 1 is connected with a personal computer 3 through a VGA terminal 10 (see FIG. 2), thereby projecting an image received from the personal computer 3 on the projection region 2. The portable projector 1 is so formed that a user 4 can use the portable projector 1 in a state carrying the same. The portable projector 1 is formed to be supplied with power by a battery 1a.

Figure 2:
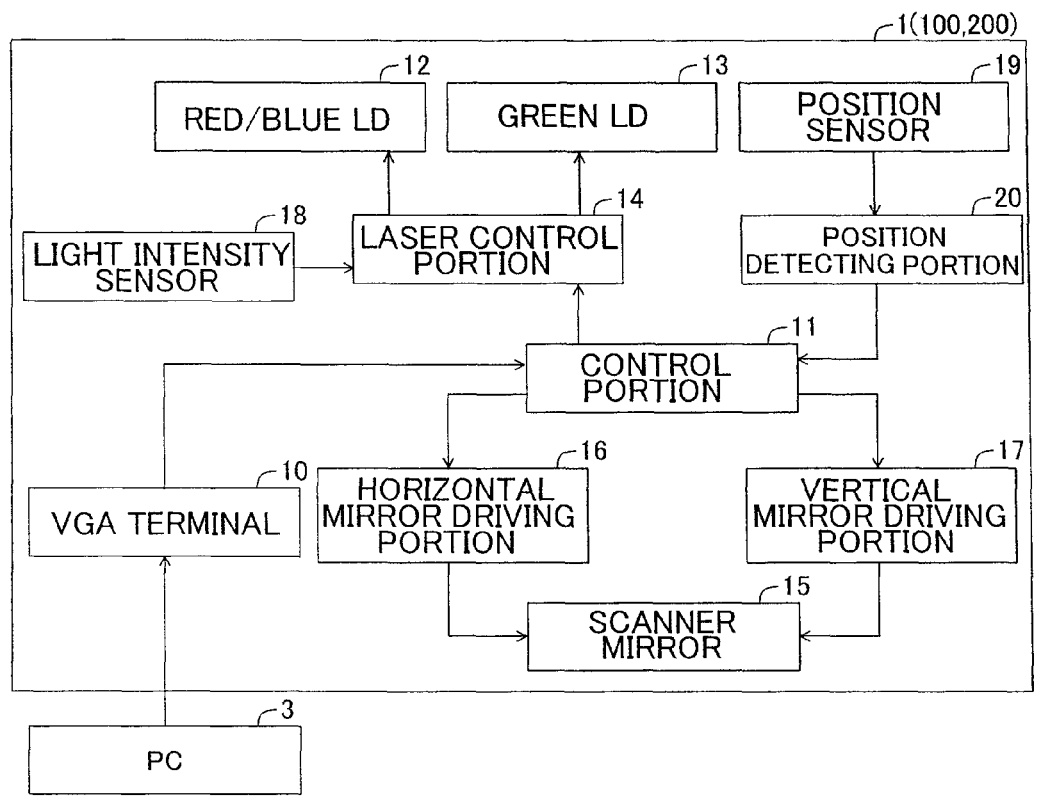
FIG. 2 is a block diagram showing the structure of the portable projector shown in FIG. 1.

As shown in FIG. 2, the portable projector 1 is provided with a control portion 11, a red/blue laser diode (red/blue LD) 12 capable of emitting the red and blue laser beams respectively, a green laser diode (green LD) 13 capable of emitting the green laser beam, and a laser control portion 14. The red/blue LD 12 serves both as the "red laser beam emitting portion" and the "blue laser beam emitting portion" in the present invention. The control portion 1 is formed to analyze the image received from the personal computer 3 and to recognize pixel information on a certain prescribed scanning position over each scanning section 30 (see FIG. 5). Further, the control portion 11 is formed to supply current to the red/blue LD 12 and the green LD 13 through the laser control portion 14, and formed to determine whether or not to stop supplying the current to the red/blue LD 12 and the green LD 13. The laser control portion 14 is formed to control the red, blue and green laser beams emitted from the red/blue LD 12 and the green LD 13 to be the RGB laser beams having prescribed gradation on the basis of the pixel information on the certain prescribed scanning position in the scanning section 30 recognized by the control portion 11. The red/blue LD 12 is an example of the "laser beam emitting portion" in the present invention, and the green LD 13 is an example of the "laser beam emitting portion" or the "green laser beam emitting portion" in the present invention.

Figure 3:
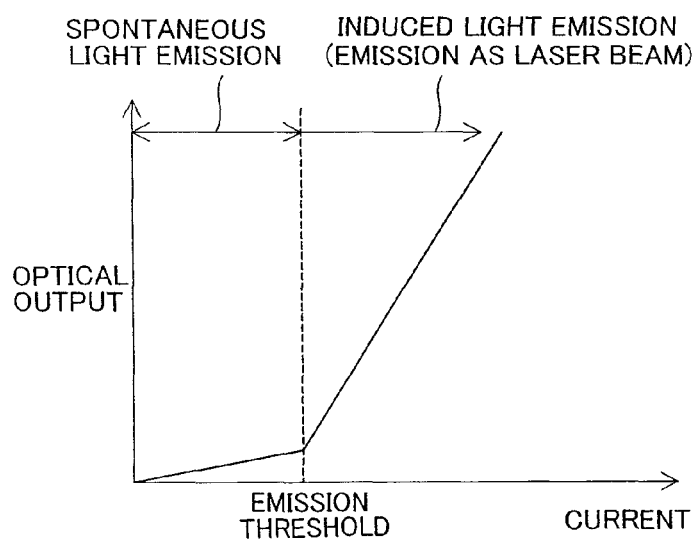
FIG. 3 is a graph showing the relation between current and optical output in a general laser diode.

Each of the red/blue LD 12 and the green LD 13 has the properties of a general laser diode shown in a graph of FIG. 3. In other words, each of the red/blue LD 12 and the green LD 13 emits the laser beam(s) by spontaneous emission when the supplied current is less than a constant value (emission threshold). When the supplied current is in excess of the constant value (emission threshold), on the other hand, each of the red/blue LD 12 and the green LD 13 emits the laser beam(s) by induced emission. Each of the red/blue LD 12 and the green LD 13 is formed to emit the laser beam(s) of larger optical output following the magnitude of the current at this time. Further, each of the red/blue LD 12 and the green LD 13 is formed to emit the laser beam(s) of higher brightness as the optical output is increased. According to the first embodiment, the portable projector 1 is so formed that the control portion 11 supplies current exceeding the constant value (emission threshold) to the red/blue LD 12 and the green LD 13 when the LDs 12 and 13 emit the laser beams and stops supplying the current to the red/blue LD 12 and the green LD 13 when the LDs 12 and 13 do not emit the laser beams.

Figure 4:
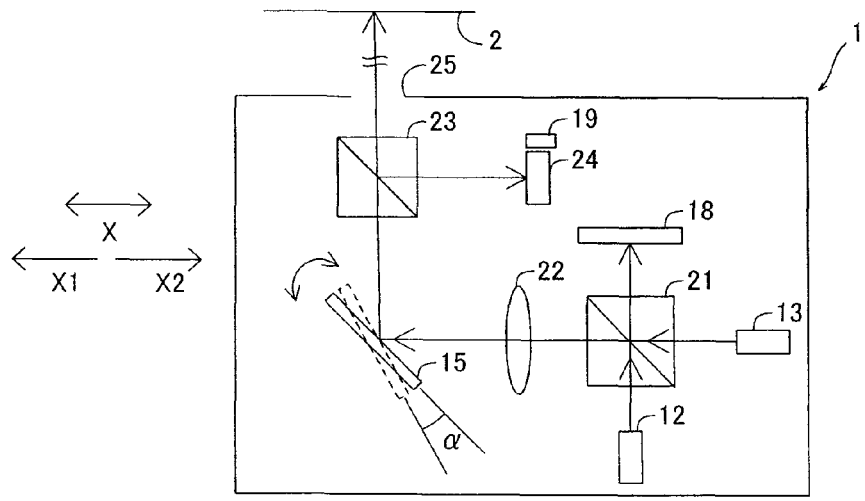
FIG. 4 illustrates an optical system for laser beams in the portable projector shown in FIG. 1.

The portable projector 1 is further provided with a scanner mirror 15 and horizontal and vertical mirror driving portions 16 and 17 controlled by the control portion 11 respectively, as shown in FIG. 2. The scanner mirror 15 is a vibratile miniature vibrating mirror element having a vibration angle α, as shown in FIG. 4. The scanner mirror 15 is formed to be vibrated by the horizontal mirror driving portion 16 (see FIG. 2) to reflect the RGB laser beams in the horizontal direction (direction X) of the projection region 2. The scanner mirror 15 is formed to be vibrated at the vibration angle α with a prescribed resonance frequency in the horizontal direction at this time. Further, the scanner mirror 15 is formed to be vibrated by the vertical mirror driving portion 17 (see FIG. 2) to reflect the RGB laser beams in the vertical direction (direction Y in FIG. 1) of the projection region 2. Thus, the scanner mirror 15 is formed to be capable of scanning the X-Y plane (see FIG. 1) of the projection region 2 with the RGB laser beams in the scanning section 30 (see FIG. 5). Further, the scanner mirror 15 is formed to be capable of scanning the X-Y plane along arrows X1 and X2. The scanner mirror 15 is an example of the "projecting portion" in the present invention.

The portable projector 1 is further provided with a light intensity sensor 18 detecting the gradation of the RGB laser beams, as shown in FIG. 2. The light intensity sensor 18 is connected with the laser control portion 14, and formed to output the detected gradation to the laser control portion 14. The laser control portion 14 is formed to analyze the gradation received from the light intensity sensor 18, to determine whether or not the gradation is correct as compared with the pixel information on the scanning position, and to control the output (brightness) of the red/blue LD 12 and the green LD 13 to obtain correct gradation if the gradation is not correct. The portable projector 1 is further provided with a position sensor 19 detecting the vibration angle α of the scanner mirror 15 and a position detection portion 20 detecting the scanning situation and outputting the same to the control portion 11 so that the scanner mirror 15 is vibrated at the constant vibration angle α.

In an optical system of the portable projector 1, the red/blue LD 12 and the green LD 13 are so arranged that the red and blue laser beams emitted by the red/blue LD 12 and the green laser beam emitted by the green LD 13 substantially perpendicularly intersect with each other, as shown in FIG. 4. A half mirror 21 is arranged on the position where the red and blue laser beams and the green laser beam perpendicularly intersect with each other. A lens 22 is arranged in a direction where the half mirror 21 partially reflects the red and blue laser beams emitted from the red/blue LD 12 while partially transmitting the green laser beam emitted from the green LD 13. The lens 22 has a function of aligning the optical axes of the red and blue laser beams and the green laser beam and converting the red and blue laser beams and the green laser beam to the RGB laser beams having the prescribed gradation. The light intensity sensor 18 is arranged in a direction where the half mirror 21 partially transmits the red and blue laser beams emitted from the red/blue LD 12 and partially reflects the green laser beam emitted from the green LD 13.

The portable projector 1 is so formed that the scanner mirror 15 reflects the RGB laser beams whose optical axes have been aligned by the lens 22 thereby scanning the projection region 2 with the RGB laser beams. Another half mirror 23 is arranged in a direction where the scanner mirror 15 reflects the RGB laser beams. The half mirror 23 is formed to partially reflect the RGB laser beams toward a scanning section confirming portion 24 for confirming the scanning section 30 (see FIG. 5) and the position sensor 19. The position sensor 19 is arranged to be located on an end portion of the scanning section confirming portion 24. The position sensor 19 is formed to detect information indicating that the scanner mirror 15 does not sufficiently scan the projection region 2 with the RGB laser beams and to output the same to the position detection portion 20 when the scanner mirror 15 is so vibrated at an angle less than the vibration angle α that the RGB laser beams are received only by the scanning section confirming portion 24 and not input in the position sensor 19. The half mirror 23 is formed to partially transmit the RGB laser beams toward the projection region 2.

A slit 25 is arranged in the direction where the half mirror 23 partially transmits the RGB laser beams. The slit 25 is provided for not projecting RGB laser beams, included in the RGB laser beams transmitted through the half mirror 23, corresponding to scanning positions (see FIG. 5) in the vicinity of end portions along arrows X1 and X2 respectively on the projection region 2. The portable projector 1 is so formed that, when the scanner mirror 15 has the vibration angle α, the RGB laser beams are reflected on the scanning positions on the end portions along arrows X1 and X2. The angular velocity of the scanner mirror 15 in the case of reflecting the RGB laser beams to the scanning position in the vicinity of the end portion along arrow X1 or X2 is small as compared with a substantially constant angular velocity of the scanner mirror 15 in a case of reflecting the RGB laser beams to scanning positions other than those in the vicinity of both end portions. Thus, it is possible to suppress turbulence in the image, projected on the projection region 2, resulting from the difference between the angular velocities by forming the slit 25 not to project the scanning positions in the vicinity of the end portions along arrows X1 and X2 on the projection region 2.

The slit 25 is so formed that an image projected on the scanning section confirming portion 24 and the image projected on the projection region 2 are substantially identical to each other. Thus, information detected by the scanning section confirming portion 24 and the position sensor 19 can be reflected on the projection of the image on the projection region 2.

Figure 5:
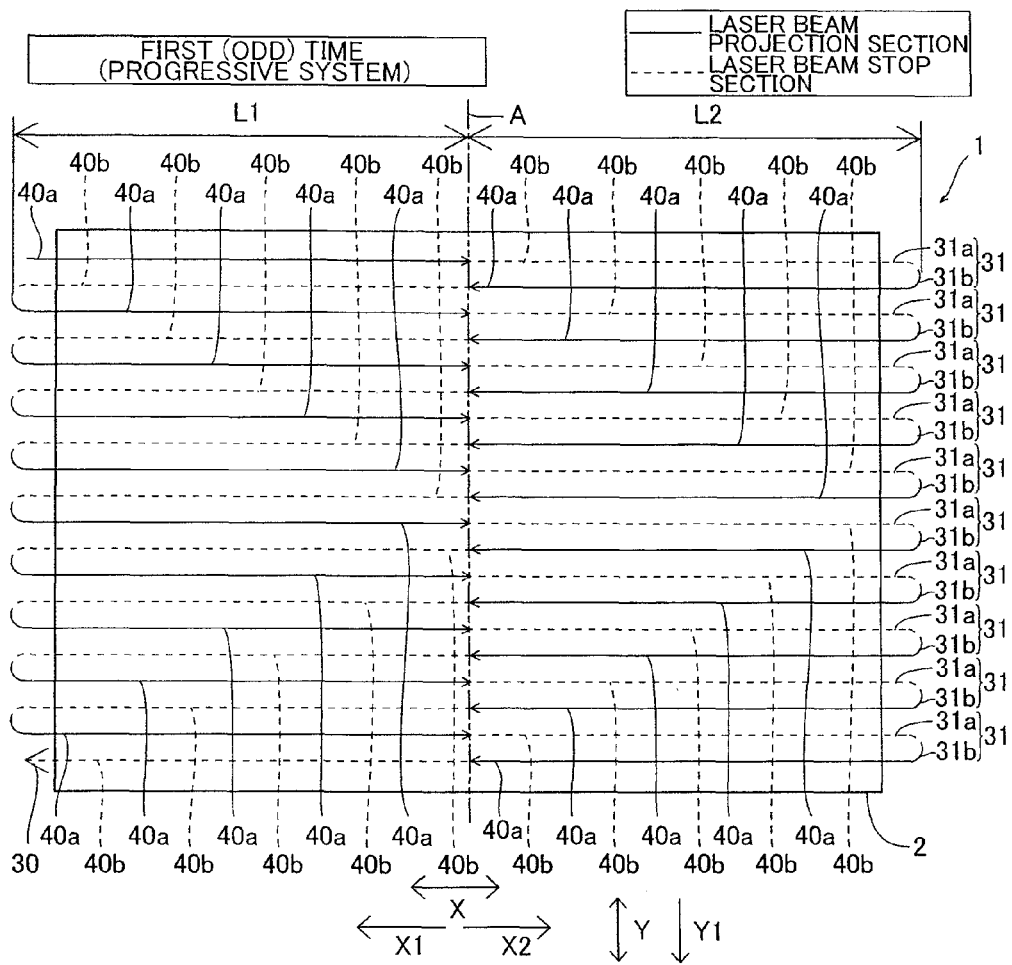
FIG. 5 illustrates first-time (odd-time) scanning of the portable projector shown in FIG. 1.

According to the first embodiment, the scanner mirror 15 (see FIG. 4) is formed to scan the projection region 2 with the RGB laser beams in the scanning section 30 to correspond to the X-Y plane of the projection region 2, as shown in FIG. 5. The scanning section 30 is formed by repetitively connecting a plurality of reciprocatory scanning sections 31 constituted of forward paths 31a directed from arrow X1 toward arrow X2 and backward paths 31b directed from arrow X2 toward arrow X1 with each other along arrow Y1. The scanner mirror 15 is vibrated on the basis of the prescribed resonance frequency, and formed to project the image of one frame on the projection region 2 by repetitively scanning the scanning section 30 with the RGB laser beams. In other words, the portable projector 1 is formed to scan the scanning section 30 with the RGB laser beams to correspond to the projection region 2 with the scanner mirror 15 by employing the progressive system.

According to the first embodiment, the portable projector 1 is so formed that the control portion 11 switches laser beam projection sections 40a and laser beam stop sections 40b on a position of a virtual centerline A of the projection region 2 and the end portions, which are the boundaries between the forward paths 31a and the backward paths 31b, along arrows X1 and X2 with previously set contents in the scanning section 30. The laser beam stop sections 40b are examples of the "previously set partial scanning section" in the present invention.

More specifically, the portable projector 1 is so formed that the control portion 11 (see FIG. 2) supplies the current to the red/blue LD 12 (see FIG. 2) and the green LD 13 (see FIG. 2) respectively in the scanning section 30 from the end portion of the forward path 31a of each of the plurality of reciprocatory scanning sections 31 along arrow X1 to the centerline A, thereby controlling the red/blue LD 12 and the green LD 13 to emit the red and blue laser beams and the green laser beam respectively in first-time scanning. Thus, the portable projector 1 is so formed that the scanning section 30 from the end portion of the forward path 31a along arrow X1 to the centerline A becomes the laser beam projecting section 40a (shown by a solid line) due to projection of the RGB laser beams. On the other hand, the portable projector 1 is so formed that the control portion 11 stops supplying the current to the red/blue LD 12 and the green LD 13 in the scanning section 30 from the centerline A to the end portion of the forward path 31a of each of the plurality of reciprocatory scanning sections 31 along arrow X2, thereby controlling the red/blue LD 12 and the green LD 13 not to emit the red and blue laser beams and the green laser beam respectively. Thus, the portable projector 1 is so formed that the scanning section 30 from the centerline A to the end portion of the forward path 31a along arrow X2 becomes the laser beam stop section 40b (shown by a broken line) due to nonprojection of the RGB laser beams.

Further, the portable projector 1 is so formed that the control portion 11 supplies the current to the red/blue LD 12 and the green LD 13 respectively in the scanning section 30 from the end portion of the backward path 31b of each of the plurality of reciprocatory scanning sections 31 along arrow X2 to the centerline A, thereby controlling the red/blue LD 12 and the green LD 13 to emit the red and blue laser beams and the green laser beam respectively in the first-time scanning. Thus, the portable projector 1 is so formed that the scanning section 30 from the end portion of the backward path 31b along arrow X2 to the centerline A becomes the laser beam projecting section 40a (shown by a solid line) due to projection of the RGB laser beams. On the other hand, the portable projector 1 is so formed that the control portion 11 stops supplying the current to the red/blue LD 12 and the green LD 13 respectively in the scanning section 30 from the centerline A to the end portion of the backward path 31b of each of the plurality of reciprocatory scanning sections 31 along arrow X1, thereby controlling the red/blue LD 12 and the green LD 13 not to emit the red and blue laser beams and the green laser beam respectively. Thus, the portable projector 1 is so formed that the scanning section 30 from the centerline A to the end portion of the backward path 31b along arrow X1 becomes the laser beam stop section 40b (shown by a broken line) due to nonprojection of the RGB laser beams. The first-time scanning is an example of the "first scanning" in the present invention.

The length L1 of the scanning section 30 from the end portion of each forward path 31a along arrow X1 to the centerline A (the length of the scanning section 30 from the centerline A to the end portion of each backward path 31b along arrow X1) is identical to the length L2 of the scanning section 30 from the end portion of each forward path 31a along arrow X2 to the centerline A (the length of the scanning section 30 from the centerline A to the end portion of each backward path 31b along arrow X2). The portable projector 1 is so formed that the lengths L1 and L2 are substantially half the lengths of the forward and backward paths 31a and 31b respectively. In other words, the portable projector 1 is so formed that the laser beam projection sections 40a and the laser beam stop sections 40b are substantially identical in length to each other.

Figure 6:
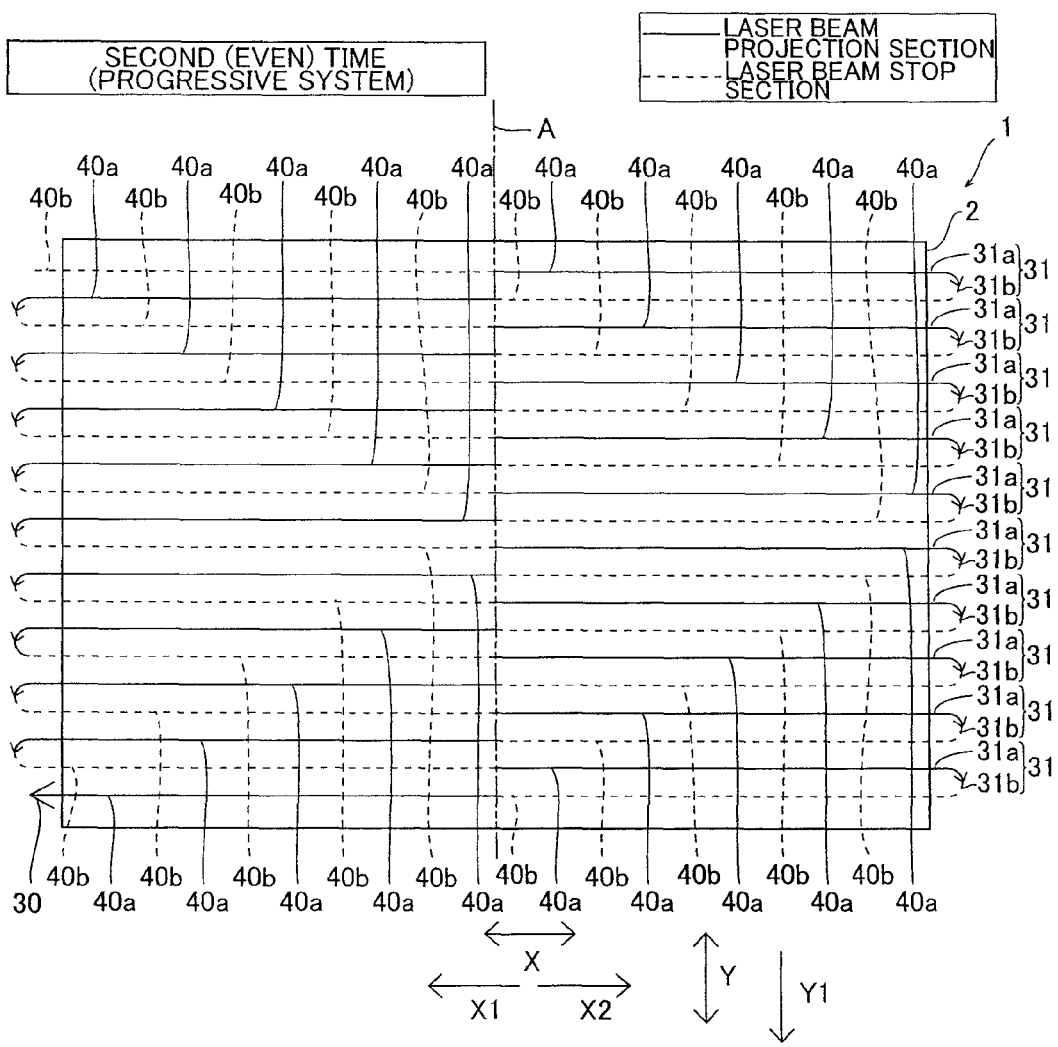
FIG. 6 illustrates second-time (even-time) scanning of the portable projector shown in FIG. 1.

According to the first embodiment, the portable projector 1 is so formed that the control portion 11 (see FIG. 2) stops supplying the current to the red/blue LD 12 (see FIG. 2) and the green LD 13 (see FIG. 2) in the scanning section 30 from the end portion of the forward path 31a of each of the plurality of reciprocatory scanning sections 31 along arrow X1 to the centerline A, thereby controlling the red/blue LD 12 and the green LD 13 not to emit the red, blue and green laser beams respectively in second-time scanning, as shown in FIG. 6. Thus, the portable projector 1 is so formed that the scanning section 30 from the end portion of the forward path 31a along arrow X1 to the centerline A becomes the laser beam stop section 40b due to nonprojection of the RGB laser beams. On the other hand, the portable projector 1 is so formed that the control portion 11 supplies the current to the red/blue LD 12 and the green LD 13 respectively in the scanning section 30 from the centerline A to the end portion of the forward path 31a of each of the plurality of reciprocatory scanning sections 31 along arrow X2, thereby controlling the red/blue LD 12 and the green LD 13 to emit the red, blue and green laser beams respectively. Thus, the portable projector 1 is so formed that scanning section 30 from the centerline A to the end portion of the forward path 31a along arrow X2 becomes the laser beam projection section 40a due to projection of the RGB laser beams.

Further, the portable projector 1 is so formed that the control portion 11 stops supplying the current to the red/blue LD 12 and the green LD 13 in the scanning section 30 from the end portion of the backward path 31b of each of the plurality of reciprocatory scanning sections 31 along arrow X2 to the centerline A, thereby controlling the red/blue LD 12 and the green LD 13 not to emit the red, blue and green laser beams respectively in the second-time scanning. Thus, the portable projector 1 is so formed that the scanning section 30 from the end portion of the backward path 31b along arrow X2 to the centerline A becomes the laser beam stop section 40b due to nonprojection of the RGB laser beams. On the other hand, the portable projector 1 is so formed that the control portion 11 supplies the current to the red/blue LD 12 and the green LD 13 respectively in the scanning section 30 from the centerline A to the end portion of the backward path 31b of each of the plurality of reciprocatory scanning sections 31 along arrow X1, thereby controlling the red/blue LD 12 and the green LD 13 to emit the red, blue and green laser beams respectively.

Thus, the portable projector 1 is so formed that the scanning section 30 from the centerline A to the end portion of the backward path 31a along arrow X1 becomes the laser beam projection section 40a due to projection of the RGB laser beams. The second-time scanning is an example of the "second scanning" in the present invention.

The portable projector 1 is so formed that the control portion 11 performs scanning similar to the first-time scanning shown in FIG. 5 in third-time scanning and performs scanning similar to the second-time scanning shown in FIG. 6 in fourth-time scanning. In other words, the portable projector 1 is so formed that the control portion 11 repeats the aforementioned odd-time scanning and the aforementioned even-time scanning.

Figure 7:
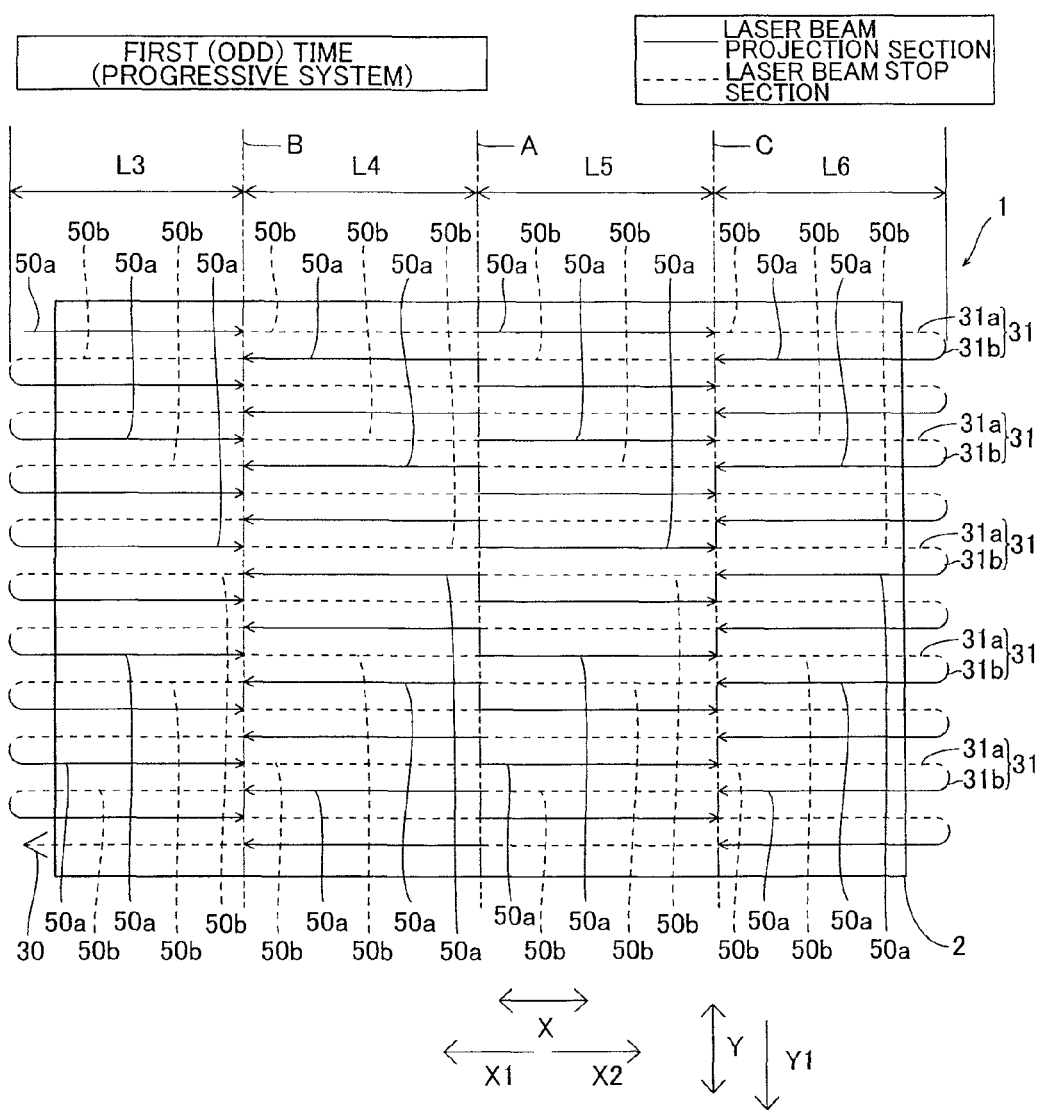
FIG. 7 illustrates first-time (odd-time) scanning in a case where such a state that current supplied to a red/blue LD and a green LD of the portable projector shown in FIG. 1 is large continues for a prescribed period.
Figure 8:
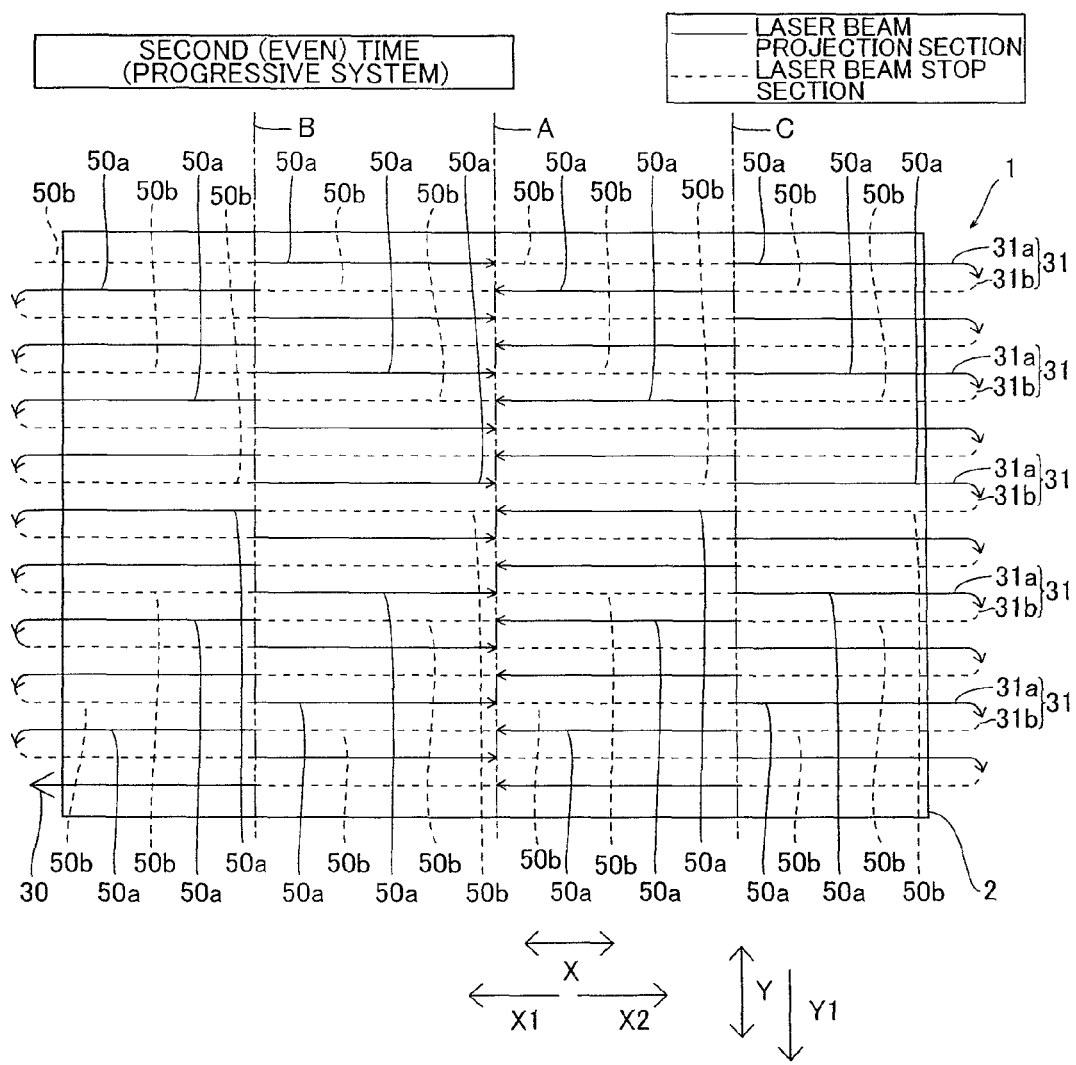
FIG. 8 illustrates second-time (even-time) scanning in the case where the state that the current supplied to the red/blue LD and the green LD of the portable projector shown in FIG. 1 is large continues for the prescribed period.

The portable projector 1 is so formed that, when such a state that the current supplied to the red/blue LD 12 (see FIG. 2) and the green LD 13 (see FIG. 2) is larger than a prescribed current value continues for a prescribed period, the control portion 11 switches laser beam projection sections 50a and laser beam stop sections 50b on the position of the centerline A, the end portions along arrows X1 and X2, i.e., the boundaries between the forward paths 31a and the backward paths 31b and the positions of virtual lines B and C respectively as shown in FIGS. 7 and 8 with previously set contents from the state where the control portion 11 (see FIG. 2) has switched the laser beam projection sections 40a and the laser beam stop sections 40b along the centerline A as shown in FIGS. 5 and 6. The virtual line B is located on a substantially intermediate position between the end portions along arrow X1 and the centerline A, while the virtual line C is located on a substantially intermediate position between the centerline A and the end portions along arrow X2. In other words, the portable projector 1 is so formed that the control portion 11 doubles the number of the scanning sections 30 (laser beam stop sections 50b) where the same stops supplying the current and substantially halves the length of each of the laser beam stop sections 50b when the state that the current supplied to the red/blue LD 12 and the green LD 13 is larger than the prescribed current value continues for the prescribed period. The laser beam stop sections 50b are examples of the "previously set partial scanning section" in the present invention.

More specifically, the portable projector 1 is so formed that the control portion 11 (see FIG. 2) controls the red/blue LD 12 (see FIG. 2) and the green LD 13 (see FIG. 2) to emit the red, blue and green laser beams respectively in the scanning section 30 from the end portion of the forward path 31a of each of the plurality of reciprocatory scanning sections 31 along arrow X1 to the line B and the scanning section 30 from the centerline A to the line C in the first-time scanning, as shown in FIG. 7. Thus, the portable projector 1 is so formed that the scanning section 30 from the end portion of the forward path 31a along arrow X1 to the line B and the scanning section 30 from the centerline A to the line C become the laser beam projection sections 50a (shown by solid lines) due to projection of the RGB laser beams respectively. On the other hand, the portable projector 1 is so formed that the control portion 11 controls the red/blue LD 12 and the green LD 13 not to emit the red, blue and green laser beams respectively in the scanning section from the line B to the centerline A and the scanning section 30 from the line C to the end portion of the backward path 31a of each of the reciprocatory scanning sections 31 along arrow X2. Thus, the portable projector 1 is so formed that the scanning section 30 from the line B to the centerline A and the scanning section 30 from the line C to the end portion of the backward path 31a along arrow X2 become the laser beam stop sections 50b (shown by dotted lines) due to nonprojection of the RGB laser beams respectively.

The portable projector 1 is so formed that the control portion 11 controls the red/blue LD 12 and the green LD 13 to emit the red, blue and green laser beams respectively in the scanning section 30 from the end portion of the backward path 31b of each of the plurality of reciprocatory scanning sections 31 along arrow X2 to the line C and the scanning section 30 from the centerline A to the line B in the first-time scanning. Thus, the portable projector 1 is so formed that the scanning section 30 from the end portion of the backward path 31b along arrow X2 to the line C and the scanning section 30 from the centerline A to the line B become the laser beam projection sections 50a (shown by solid lines) due to projection of the RGB laser beams respectively. On the other hand, the portable projector 1 is so formed that the control portion 11 controls the red/blue LD 12 and the green LD 13 not to emit the red, blue and green laser beams respectively in the scanning section 30 from the line C to the centerline A and the scanning section 30 from the line B to the end portion of the backward path 31b of each of the plurality of reciprocatory scanning sections 31 along arrow X1. Thus, the portable projector 1 is so formed that the scanning section 30 from the line C to the centerline A and the scanning section 30 from the line B to the end portion of the backward path 31b along arrow X1 become the laser beam stop sections 50b (shown by dotted lines) due to nonprojection of the RGB laser beams respectively.

Further, the portable projector 1 is so formed that the length L3 of the scanning section 30 from the end portion of the forward path 31a along arrow X1 to the line B (the length of the scanning section 30 from the line B to the end portion of the backward path 31b along arrow X1), the length L4 of the scanning section 30 from the line B to the centerline A in the forward path 31a (the length of the scanning section 30 from the centerline A to the line B in the backward path 31b), the length L5 of the scanning section 30 from the centerline A to the line C in the forward path 31a (the length of the scanning section 30 from the line C to the centerline A in the backward path 31b) and the length L6 of the scanning section 30 from the line C to the end portion of the forward path 31a along arrow X2 (the length of the scanning section 30 from the end portion of the backward path 31b along arrow X2 to the line C) are substantially identical to each other. In other words, the portable projector 1 is so formed that the laser beam projection sections 50a and the laser beam stop sections 50b are substantially identical in length to each other.

As shown in FIG. 8, the portable projector 1 is so formed that the control portion 11 (see FIG. 2) controls the red/blue LD 12 (see FIG. 2) and the green LD 13 (see FIG. 2) not to emit the red, blue and green laser beams respectively in the scanning section 30 from the end portion of the forward path 31a of each of the plurality of reciprocatory scanning sections 31 along arrow X1 to the line B and the scanning section 30 from the centerline A to the line C in the second-time scanning. Thus, the portable projector 1 is so formed that the scanning section 30 from the end portion of the forward path 31a along arrow X1 to the line B and the scanning section 30 from the centerline A to the line C become the laser beam stop sections 50b due to nonprojection of the RGB laser beams respectively. On the other hand, the portable projector 1 is so formed that the control portion 11 controls the red/blue LD 12 and the green LD 13 to emit the red, blue and green laser beams respectively in the scanning section 30 from the line B to the centerline A and the scanning section 30 from the line C to the end portion of the forward path 31a of each of the reciprocatory scanning sections 31 along arrow X2. Thus, the portable projector 1 is so formed that the scanning section 30 from the line B to the centerline A and the scanning section 30 from the line C to the end portion of the forward path 31a along arrow X2 become the laser beam projection sections 50a due to projection of the RGB laser beams respectively.

The portable projector 1 is so formed that the control portion 11 controls the red/blue LD 12 and the green LD 13 not to emit the red, blue and green laser beams respectively in the scanning section 30 from the end portion of the backward path 31b of each of the plurality of reciprocatory scanning sections 31 along arrow X2 to the line C and the scanning section 30 from the centerline A to the line B in the second-time scanning. Thus, the portable projector 1 is so formed that the scanning section 30 from the end portion of the backward path 31b along arrow X2 to the line C and the scanning section 30 from the centerline A to the line B become the laser beam stop sections 50b due to nonprojection of the RGB laser beams respectively. On the other hand, the portable projector 1 is so formed that the control portion 11 controls the red/blue LD 12 and the green LD 13 to emit the red, blue and green laser beams respectively in the scanning section 30 from the line C to the centerline A and the scanning section from the line B to the end portion of the backward path 31b of each of the plurality of reciprocatory scanning sections 31 along arrow X1. Thus, the portable projector 1 is so formed that the scanning section 30 from the line C to the centerline A and the scanning section from the line B to the end portion of the backward path 31b along arrow X1 become the laser beam projection sections 50a due to projection of the RGB laser beams respectively.

Further, the portable projector 1 is so formed that the control portion 11 performs scanning similar to the first-time scanning shown in FIG. 7 in the third-time scanning and performs scanning similar to the second-time scanning shown in FIG. 8 in the fourth-time scanning. In other words, the portable projector 1 is so formed that the control portion 11 repeats the aforementioned odd-time scanning and the aforementioned even-time scanning.

According to the first embodiment, as hereinabove described, the portable projector 1 is so formed that the control portion 11 stops supplying the current to the red/blue LD 12 and the green LD 13 respectively thereby controlling the red/blue LD 12 and the green LD 13 not to emit the red, blue and green laser beams respectively in the laser beam stop sections 40b formed by the scanning section 30 from the centerline A to the end portion of the forward path 31a of each of the plurality of reciprocatory scanning sections 31 along arrow X2 and the scanning section 30 from the centerline A to the end portion of the backward path 31b of each of the plurality of reciprocatory scanning sections 31 along arrow X1 in the first-time scanning so that the control portion 11 is previously set to control the red/blue LD 12 and the green LD 13 not to emit the laser beams respectively in the laser beam stop sections 40b, whereby the red/blue LD 12 and the green LD 13 can be reliably inhibited from continuously emitting the laser beams respectively. Further, the red/blue LD 12 and the green LD 13 can outwardly discharge heat, generated by the emission of the laser beams, in the laser beam stop sections 40b of both of the scanning section 30 from the centerline A to the end portion of the forward path 31a along arrow X2 and the scanning section 30 from the centerline A to the end portion of the backward path 31b along arrow X1 respectively, whereby temperature rise in the red/blue LD 12 and the green LD 13 can be further suppressed. Thus, a color-displayable projector capable of suppressing reduction in luminous efficiency (optical output with respect to current) of the red/blue LD 12 and the green LD 13 resulting from temperature rise can be obtained. Further, the control portion 11 may not continuously feed the current exceeding the emission threshold to the red/blue LD 12 and the green LD 12 in the laser beam stop sections 40b respectively, whereby power consumption can be further reduced.

According to the first embodiment, as hereinabove described, the portable projector 1 is so formed that the length L1 of the scanning section 30 from the end portion of each forward path 31a along arrow X1 to the centerline A (the length of the scanning section 30 from the centerline A to the end portion of each backward path 31b along arrow X1) and the length L2 of the scanning section 30 from the centerline A to the end portion of each forward path 31a along arrow X2 (the length of the scanning section 30 from the end portion of each backward path 31b along arrow X2 to the centerline A) are substantially half the lengths of the forward and backward paths 31a and 31b respectively, whereby the red/blue LD 12 and the green LD 13 can be inhibited from continuously emitting the laser beams respectively. Further, the control portion 11 controls the red/blue LD 12 and the green LD 13 not to emit the laser beams respectively in the laser beam stop sections 40b, i.e., both of either the scanning section 30, whose length is substantially half that of the forward path 31a, from the end portion of the forward path 31a along arrow X1 to the centerline A or the scanning section 30 from the centerline A to the end portion of the forward path 31a along arrow X2 and either the scanning section 30 from the centerline A to the end portion of the backward path 31b along arrow X1 or the scanning section 30 from the end portion of the backward path 31b along arrow X2 to the centerline A so that the red/blue LD 12 and the green LD 12 can outwardly discharge the heat respectively, whereby temperature rise in the red/blue LD 12 and the green LD 12 can be effectively suppressed.

According to the first embodiment, as hereinabove described, the control portion 11 switches the laser beam projection sections 40a and the laser beam stop sections 40b on substantially intermediate positions of the forward paths 31a and the backward paths 31b and the end portions along arrows X1 and X2, whereby the red/blue LD 12 and the green LD 13 can be reliably inhibited from continuously emitting the laser beams and can outwardly discharge the heat, generated by the emission of the laser beams, in the laser beam stop sections 40b respectively.

According to the first embodiment, as hereinabove described, the portable projector 1 is so formed that the laser beam projection sections 40a and the laser beam stop sections 40b are substantially identical in length to each other and the laser beam projection sections 50a and the laser beam stop sections 50b are also substantially identical in length to each other for sufficiently ensuring the laser beam stop sections 40b (50b), whereby the red/blue LD 12 and the green LD 13 can sufficiently outwardly discharge the heat respectively. Thus, temperature rise in the red/blue LD 12 and the green LD 13 can be effectively suppressed.

According to the first embodiment, as hereinabove described, the portable projector 1 is formed as a miniature projector carriable by the user and supplied with power by the battery 1a, whereby the portable projector 1 is so reduced in power consumption that the same can be used over a long period of time.

According to the first embodiment, as hereinabove described, the portable projector 1 is so formed that the control portion 11 stops supplying the current to the red/blue LD 12 and the green LD 13 in the laser beam stop sections 40b, i.e., the scanning section 30 from the centerline A to the end portion of each forward path 31a along arrow X2 and the scanning section 30 from the centerline A to the end portion of each backward path 31b along arrow X1 in the first-time (odd-time) scanning thereby controlling the red/blue LD 12 and the green LD 13 not to emit the red, blue and green laser beams respectively in the first-time (odd-time) scanning and supplies the current to the red/blue LD 12 and the green LD 13 respectively in the laser beam projection sections 40*a*, i.e., the scanning section 30 from the centerline A to the end portion of each forward path 31*a* along arrow X2 and the scanning section 30 from the centerline A to the end portion of each backward path 31*b* along arrow X1 thereby controlling the red/blue LD 12 and the green LD 13 to emit the red, blue and green laser beams respectively in the second-time (even-time) scanning, whereby it is possible to compensate for the scanning section 30 from the centerline A to the end portion of the forward path 31*a* along arrow X2 and the scanning section 30 from the centerline A to the end portion of the backward path 31*b* along arrow X1, in which the control portion 11 has controlled the red/blue LD 12 and the green LD 13 not to emit the laser beams in the first-time (odd-time) scanning, by controlling the red/blue LD 12 and the green LD 13 to emit the laser beams respectively in the subsequent second-time (even-time) scanning. Thus, the image projected on the projection region 2 can be further reliably prevented from reduction in resolution resulting from the presence of the laser beam stop sections 40*b*, i.e., the scanning section 30 from the centerline A to the end portion of the forward path 31*a* along arrow X2 and the scanning section 30 from the centerline A to the end portion of the backward path 31*b* along arrow X1, in which the control portion 11 has controlled the red/blue LD 12 and the green LD 13 not to emit the laser beams.

According to the first embodiment, as hereinabove described, the portable projector 1 is so formed that the control portion 11 stops supplying the current to the red/blue LD 12 and the green LD 13 respectively in the laser beam stop sections 40*b*, i.e., the scanning section 30 from the end portion of each forward path 31*a* along arrow X1 to the centerline A and the scanning section 30 from the end portion of each backward path 31*b* along arrow X2 to the centerline A thereby controlling the red/blue LD 12 and the green LD 13 not to emit the red, blue and green laser beams respectively in the second-time scanning, whereby the red/blue LD 12 and the green LD 13 can be inhibited from continuously emitting the laser beams and can outwardly discharge the heat, generated by the emission of the laser beams, in the laser beam stop sections 40*b* respectively.

According to the first embodiment, as hereinabove described, the portable projector 1 is so formed that the control portion 11 doubles the number of the laser beam stop sections 50*b* and substantially halves the length of each of the laser beam stop sections 50*b* when the state where the current supplied to the red/blue LD 12 and the green LD 13 is larger than the prescribed current value continues for the prescribed period, whereby the red/blue LD 12 and the green LD 13 can be further inhibited from continuously emitting the laser beams by increasing the number of the scanning sections 30 (laser beam stop sections 50*b*) for stopping supplying the current to the red/blue LD 12 and the green LD 13 when the temperatures in the red/blue LD 12 and the green LD 13 are easily increased due to the continuation of the state where the current supplied to the red/blue LD 12 and the green LD 13 is larger than the prescribed current value for the prescribed period. Thus, temperature rise in the red/blue LD 12 and the green LD 13 can be further suppressed. Further, the control portion 11 so substantially halves the length of each of the laser beam stop sections 50*b* that reduction in the total extension of the scanning sections 30 (laser beam projection sections 50*a*) for projecting the laser beams can be suppressed despite the increase in the number of the scanning sections 30 (laser beam stop sections 50*b*) for stopping supplying the current to the red/blue LD 12 and the green LD 13, whereby the image projected on the projection region 2 can be prevented from reduction in resolution. Consequently, the portable projector 1 can project the image on the projection region 2 while properly suppressing both of temperature rise in the red/blue LD 12 and the green LD 13 resulting from emission of the laser beams and reduction in resolution of the image projected on the projection region 2 resulting from nonemission of the laser beams.

Second Embodiment

A second embodiment of the present invention is now described with reference to FIGS. 2, 9 and 10. In a portable projector 100 according to the second embodiment, a control portion 11 switches laser beam projection sections 160*a* and laser beam stop sections 160*b* in forward paths 31*a* and backward paths 31*b*, dissimilarly to the aforementioned first embodiment.

Figure 9:
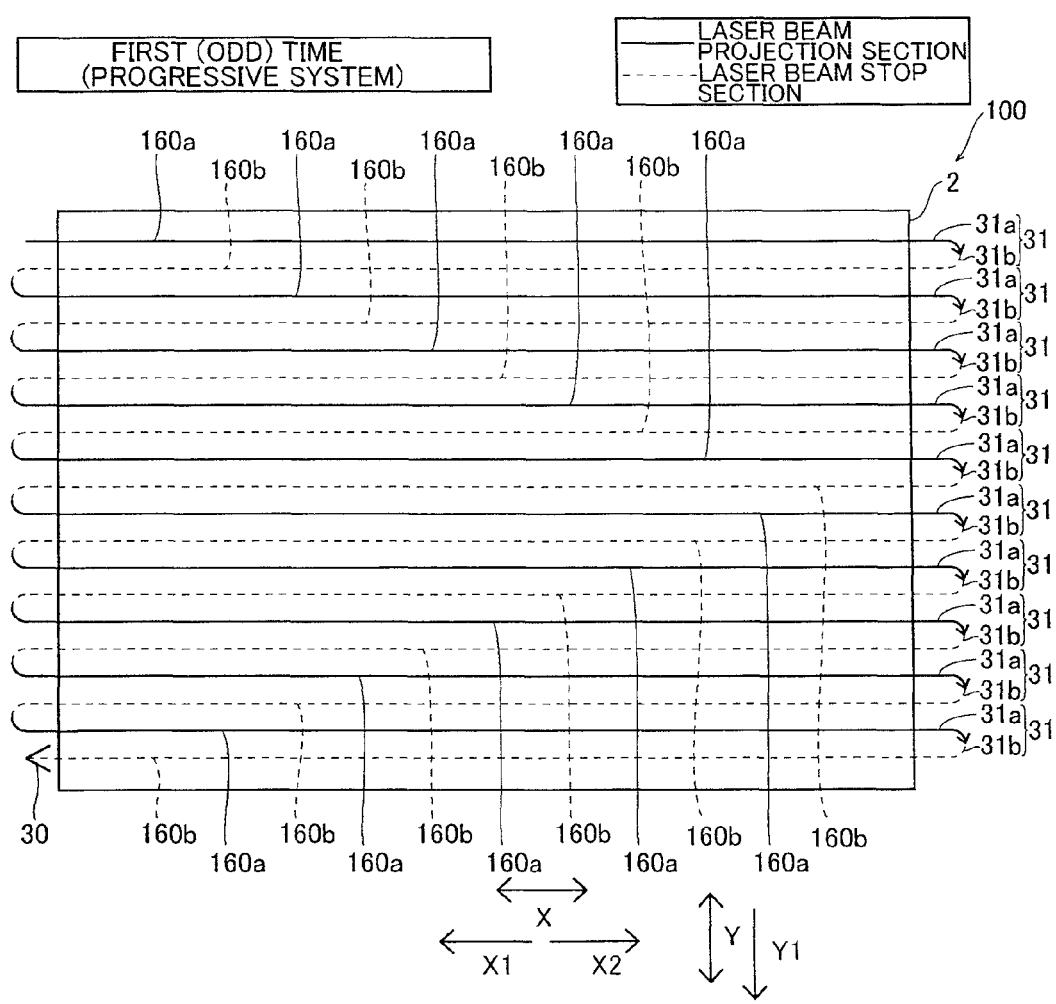
FIG. 9 illustrates first-time (odd-time) scanning of a portable projector according to a second embodiment of the present invention.

The portable projector 100 according to the second embodiment of the present invention is so formed that the control portion 11 (see FIG. 2) switches the laser beam projection sections 160*a* and the laser beam stop sections 160*b* in the forward paths 31*a* and the backward paths 31*b* with previously set contents, as shown in FIG. 9. The portable projector 100 is an example of the "projector" in the present invention, and the laser beam stop sections 160*b* are examples of the "previously set partial scanning section" in the present invention.

More specifically, the portable projector 100 is so formed that the control portion 11 controls a red/blue LD 12 (see FIG. 2) and a green LD 13 (see FIG. 2) to emit red, blue and green laser beams respectively in a scanning section 30 consisting of the forward path 31*a* of each of a plurality of reciprocatory scanning sections 31 in first-time (odd-time) scanning. Thus, the portable projector 100 is so formed that the scanning section 30 consisting of the forward path 31*a* becomes the laser beam projection section 160*a* due to projection of RGB laser beams. On the other hand, the portable projector 100 is so formed that the control portion 11 controls the red/blue LD 12 and the green LD 13 not to emit the red, blue and green laser beams respectively in a scanning section 30 consisting of the backward path 31*b* of each of the plurality of reciprocatory scanning sections 31. Thus, the portable projector 100 is so formed that the scanning section 30 consisting of the backward path 31*b* becomes the laser beam stop section 160*b* due to nonprojection of the RGB laser beams.

Figure 10:
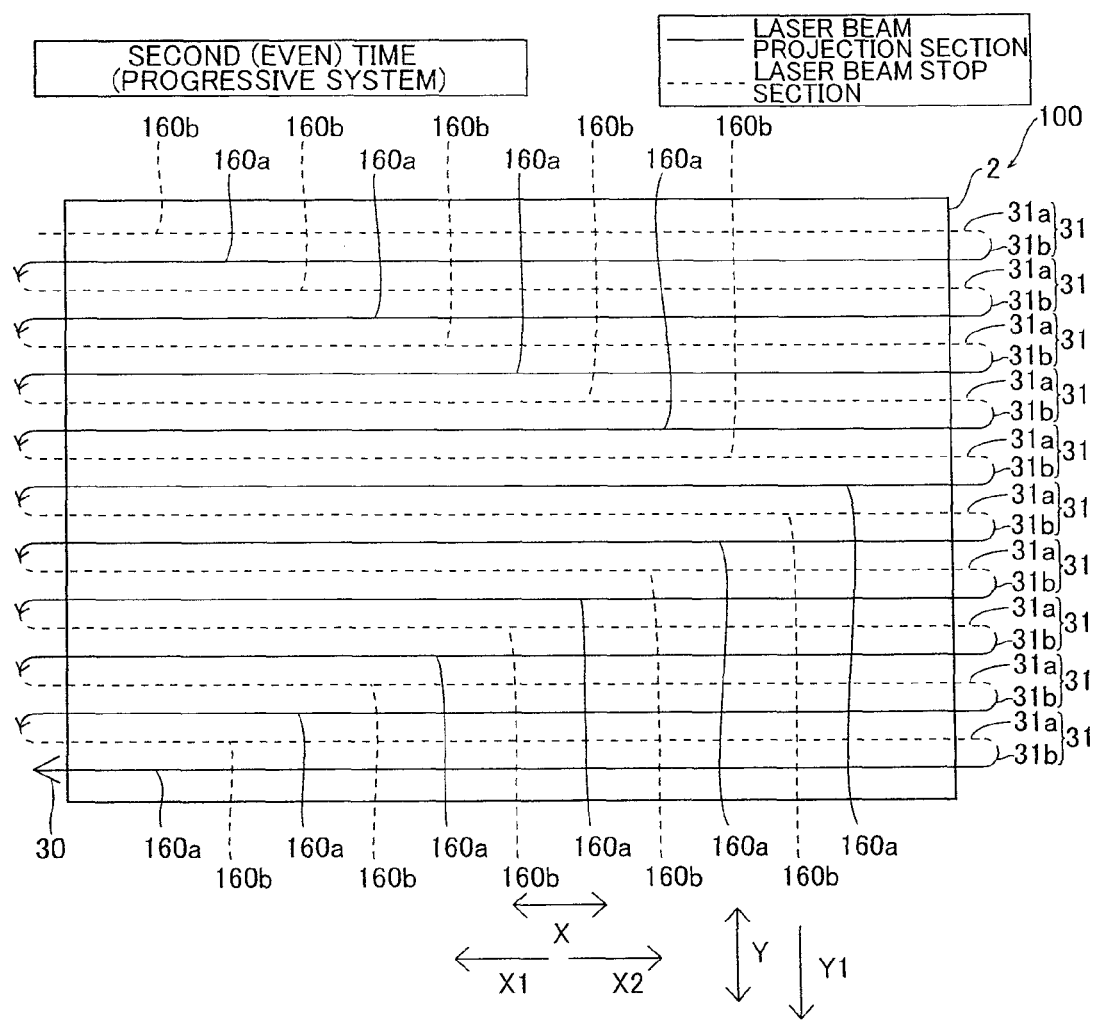
FIG. 10 illustrates second-time (even-time) scanning of the portable projector shown in FIG. 9.

As shown in FIG. 10, the portable projector 100 is so formed that the control portion 11 controls the red/blue LD 12 and the green LD 13 not to emit the red, blue and green laser beams respectively in the scanning section 30 consisting of the forward path 31*a* of each of the plurality of reciprocatory scanning sections 31 in second-time (even-time) scanning. Thus, the portable projector 100 is so formed that the scanning section 30 consisting of the forward path 31*a* becomes the laser beam stop section 160*b* due to nonprojection of the RGB laser beams. On the other hand, the portable projector 100 is so formed that the control portion 11 controls the red/blue LD 12 and the green LD 13 to emit the red, blue and green laser beams respectively in the scanning section 30 consisting of the backward path 31*b* of each of the plurality of reciprocatory scanning sections 31. Thus, the portable projector 100 is so formed that the scanning section 30 consisting of the backward path 31*b* becomes the laser beam projection section 160*a* due to projection of the RGB laser beams.

Therefore, the portable projector 100 is so formed that the control portion 11 switches the laser beam projection sections 160a and the laser beam stop sections 160b on end portions along arrows X1 and X2, i.e., the boundaries between the forward paths 31a and the backward paths 31b, in the scanning sections 30 with the previously set contents. The remaining structure of the second embodiment is similar to that of the aforementioned first embodiment.

According to the second embodiment, as hereinabove described, the portable projector 100 is so formed that the control portion 11 controls the red/blue LD 12 and the green LD 13 to emit the red, blue and green laser beams respectively in the scanning section 30 (laser beam projection section 160a) consisting of the forward path 31a of each of the plurality of reciprocatory scanning sections 31 while controlling the red/blue LD 12 and the green LD 13 not to emit the red, blue and green laser beams respectively in the scanning section 30 (laser beam stop section 160b) consisting of the backward path 31b of each of the plurality of reciprocatory scanning sections 31 in the first-time (odd-time) scanning and controls the red/blue LD 12 and the green LD 13 not to emit the red, blue and green laser beams respectively in the scanning section 30 (laser beam stop section 160b) consisting of the forward path 31a while controlling the red/blue LD 12 and the green LD 13 to emit the red, blue and green laser beams respectively in the scanning section 30 (laser beam projection section 160a) consisting of the backward path 31b in the second-time (even-time) scanning, whereby the red/blue LD 12 and the green LD 13 can be reliably inhibited from continuously emitting the laser beams. Further, the red/blue LD 12 and the green LD 13 can outwardly discharge heat, generated in the backward path 31b, in the forward path 31a, and can outwardly discharge heat, generated in the forward path 31a, in the backward path 31b respectively. Thus, temperature rise in the red/blue LD 12 and the green LD 13 can be suppressed, whereby the red/blue LD 12 and the green LD 13 can be inhibited from reduction in luminous efficiency resulting from temperature rise. The remaining effects of the second embodiment are similar to those of the aforementioned first embodiment.

Third Embodiment

A third embodiment of the present invention is now described with reference to FIGS. 2, 11 and 12. In a portable projector 200 according to the third embodiment, a scanner mirror 15 scans a first scanning section 270 and a second scanning section 280 with RGB laser beams to correspond to a projection region 2 according to an interlace system, dissimilarly to the aforementioned first embodiment.

Figure 11:
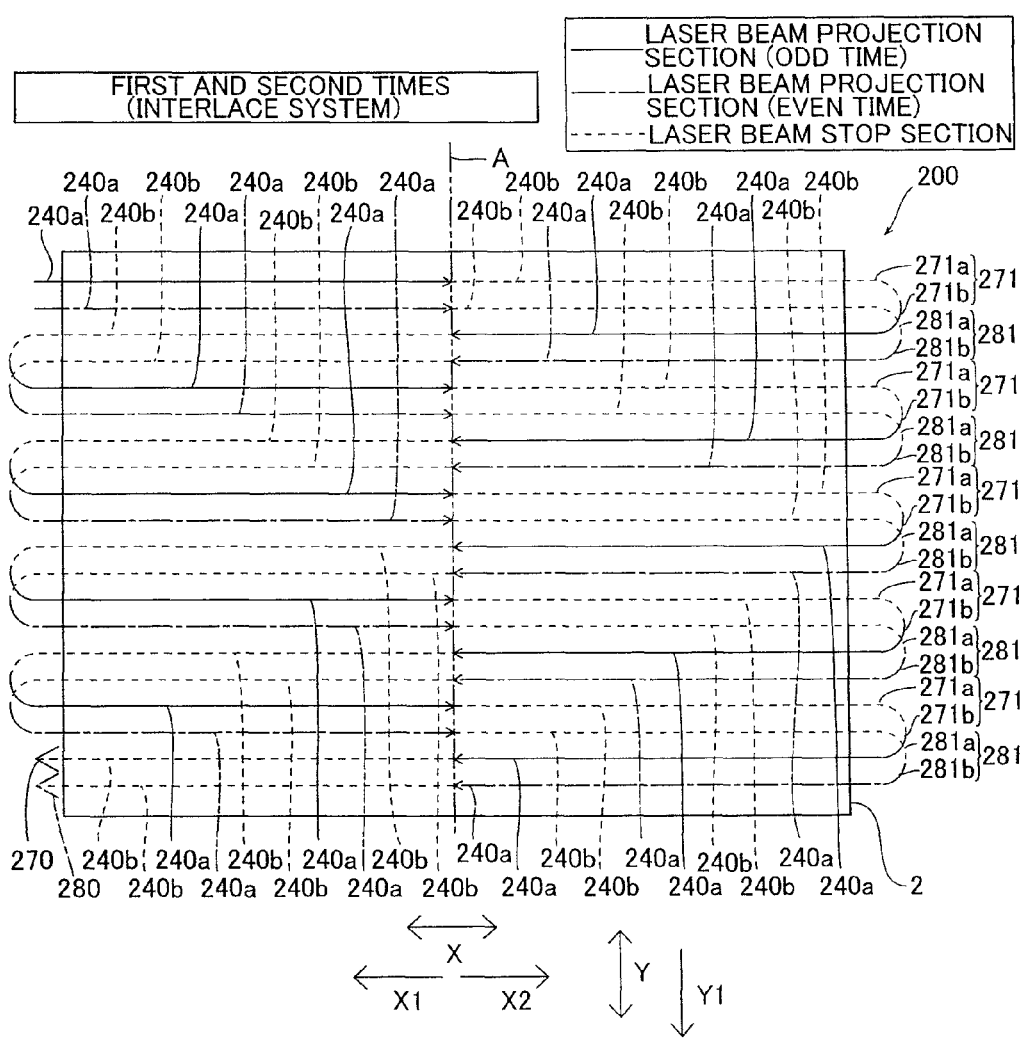
FIG. 11 illustrates first-time scanning and second-time scanning of a portable projector according to a third embodiment of the present invention.

The portable projector 200 according to the third embodiment of the present invention is so formed that the scanner mirror 15 (see FIG. 2) scans the first scanning section 270, corresponding to a prescribed region of the projection region 2, and the second scanning section 280, corresponding to a region of the projection region 2 different from that corresponding to the first scanning section 270, with the RGB laser beams to correspond to an X-Y plane of the projection region 2, as shown in FIG. 11. The scanner mirror 15 is formed to repeat an operation of scanning the first scanning section 270 and the second scanning section 280 as a set and to alternately scan the first scanning section 270 and the second scanning section 280 thereby projecting an image on the projection region 2. The portable projector 200 is an example of the "projector" in the present invention.

The first scanning section 270 is formed by repetitively connecting first reciprocatory scanning sections 271 constituted of first forward paths 271a directed from arrow X1 toward arrow X2 and first backward paths 271b directed from arrow X2 toward arrow X1 with each other along arrow Y1. The second scanning section 280 is formed by repetitively connecting second reciprocatory scanning sections 281 constituted of second forward paths 281a directed from arrow X1 toward arrow X2 and second backward paths 281b directed from arrow X2 toward arrow X1 with each other along arrow Y1. The portable projector 200 is so formed that the second forward paths 281a and the second backward paths 281b are positioned between the first forward paths 271a and the first backward paths 271b in a direction Y respectively. Further, the scanner mirror 15 is vibrated on the basis of a prescribed resonance frequency, and is formed to project an image of one frame on the projection region 2 by scanning the projection region 2 with the RGB laser beams four times at prescribed time intervals. In other words, the portable projector 200 is so formed that the scanner mirror 15 scans the first scanning section 270 and the second scanning section 271 with the RGB laser beams to correspond to the projection region 2 by employing the interlace system. The first reciprocatory scanning sections 271 and the second reciprocatory scanning sections 281 are examples of the "reciprocatory scanning section" in the present invention respectively. The first forward paths 271a and the second forward paths 281a are examples of the "forward path" in the present invention respectively, while the first backward paths 271b and the second backward paths 281b are examples of the "backward path" in the present invention respectively.

According to the third embodiment, the portable projector 200 is so formed that a control portion 11 (see FIG. 2) switches laser beam projection sections 240a and laser beam stop sections 240b on a centerline A and end portions along arrows X1 and X2, which are the boundaries between the first forward paths 271a and the first backward paths 271b and the boundaries between the second forward paths 281a and the second backward paths 281b respectively, in the first scanning section 270 and the second scanning section 280 with previously set contents. The laser beam stop sections 240b are examples of the "previously set partial scanning section" in the present invention.

More specifically, the portable projector 200 is so formed that the control portion 11 controls a red/blue LD 12 and a green LD 13 to emit red, blue and green laser beams respectively in the first scanning section 271 from an end portion of the first forward path 271a of each of the plurality of first reciprocatory scanning sections 271 along arrow X1 to the centerline A in first-time scanning. Thus, the portable projector 200 is so formed that the first scanning section 270 from the end portion of the first forward path 271a along arrow X1 to the centerline A becomes the laser beam projection section 240a due to projection of the RGB laser beams. On the other hand, the portable projector 200 is so formed that the control portion 11 controls the red/blue LD 12 and the green LD 13 not to emit the red, blue and green beams respectively in the first scanning section 270 from the centerline A to an end portion of the first forward path 271a of each of the plurality of first reciprocatory scanning sections 271 along arrow X2. Thus, the portable projector 200 is so formed that the first scanning section 270 from the centerline A to the end portion of the first forward path 271a along arrow X2 becomes the laser beam stop section 240b due to nonprojection of the RGB laser beams. The first-time scanning is an example of the "first scanning" in the present invention.

Further, the portable projector 200 is so formed that the control portion 11 controls the red/blue LD 12 and the green LD 13 to emit the red, blue and green laser beams respectively in the first scanning section 270 from the end portion of the first forward path 271b of each of the plurality of reciprocatory scanning sections 271 along arrow X2 to the centerline A in the first-time scanning. Thus, the portable projector 200 is so formed that the first scanning section 270 from the end portion of the first forward path 271b along arrow X2 to the centerline A becomes the laser beam projection section 240a due to projection of the RGB laser beams. On the other hand, the portable projector 200 is so formed that the control portion 11 controls the red/blue LD 12 and the green LD 13 not to emit the red, blue and green laser beams respectively in the first scanning section 270 from the centerline A to the end portion of the first backward path 271b of each of the plurality of first reciprocatory scanning sections 271. Thus, the portable projector 200 is so formed that the first scanning section 270 from the centerline A to the end portion of the first backward path 271b along arrow X1 becomes the laser beam stop section 240b due to nonprojection of the RGB laser beams.

According to the third embodiment, the portable projector 200 is so formed that the control portion 11 (see FIG. 2) controls the red/blue LD 12 (see FIG. 2) and the green LD 13 (see FIG. 2) to emit the red, blue and green laser beams respectively in the second scanning section 280 from an end portion of the second forward path 281a of each of the plurality of second reciprocatory scanning sections 281 along arrow X1 to the centerline A in second-time scanning, as shown in FIG. 11. Thus, the portable projector 200 is so formed that the second scanning section 280 from the end portion of the second forward path 281a along arrow X1 to the centerline A becomes the laser beam projection section 240a due to projection of the RGB laser beams. On the other hand, the portable projector 200 is so formed that the control portion 11 controls the red/blue LD 12 and the green LD 13 not to emit the red, blue and green laser beams respectively in the second scanning section 280 from the centerline A to an end portion of the second forward path 281a of each of the plurality of second reciprocatory scanning sections 281 along arrow X2. Thus, the portable projector 200 is so formed that the second scanning section 280 from the centerline A to the end portion of the second forward path 281a along arrow X2 becomes the laser beam stop section 240b due to nonprojection of the RGB laser beams.

Further, the portable projector 200 is so formed that the control portion 11 controls the red/blue LD 12 and the green LD 13 to emit the red, blue and green laser beams respectively in the second scanning section 280 from an end portion of the second backward path 281b of each of the plurality of second reciprocatory scanning sections 281 to the centerline A in second-time scanning. Thus, the portable projector 200 is so formed that the second scanning section 280 from the end portion of the second backward path 281b along arrow X2 to the centerline A becomes the laser beam projection section 240a due to projection of the RGB laser beams. On the other hand, the portable projector 200 is so formed that the control portion 11 controls the red/blue LD 12 and the green LD 13 not to emit the red, blue and green laser beams respectively in the second scanning section 280 from the centerline A to an end portion of the second backward path 281b of each of the plurality of second reciprocatory scanning sections 281 along arrow X1. Thus, the portable projector 200 is so formed that the second scanning section 280 from the centerline A to the end portion of the second backward path 281b along arrow X1 becomes the laser beam stop section 240b due to non-projection of the RGB laser beams. The second-time scanning is an example of the "first scanning" in the present invention.

Figure 12:
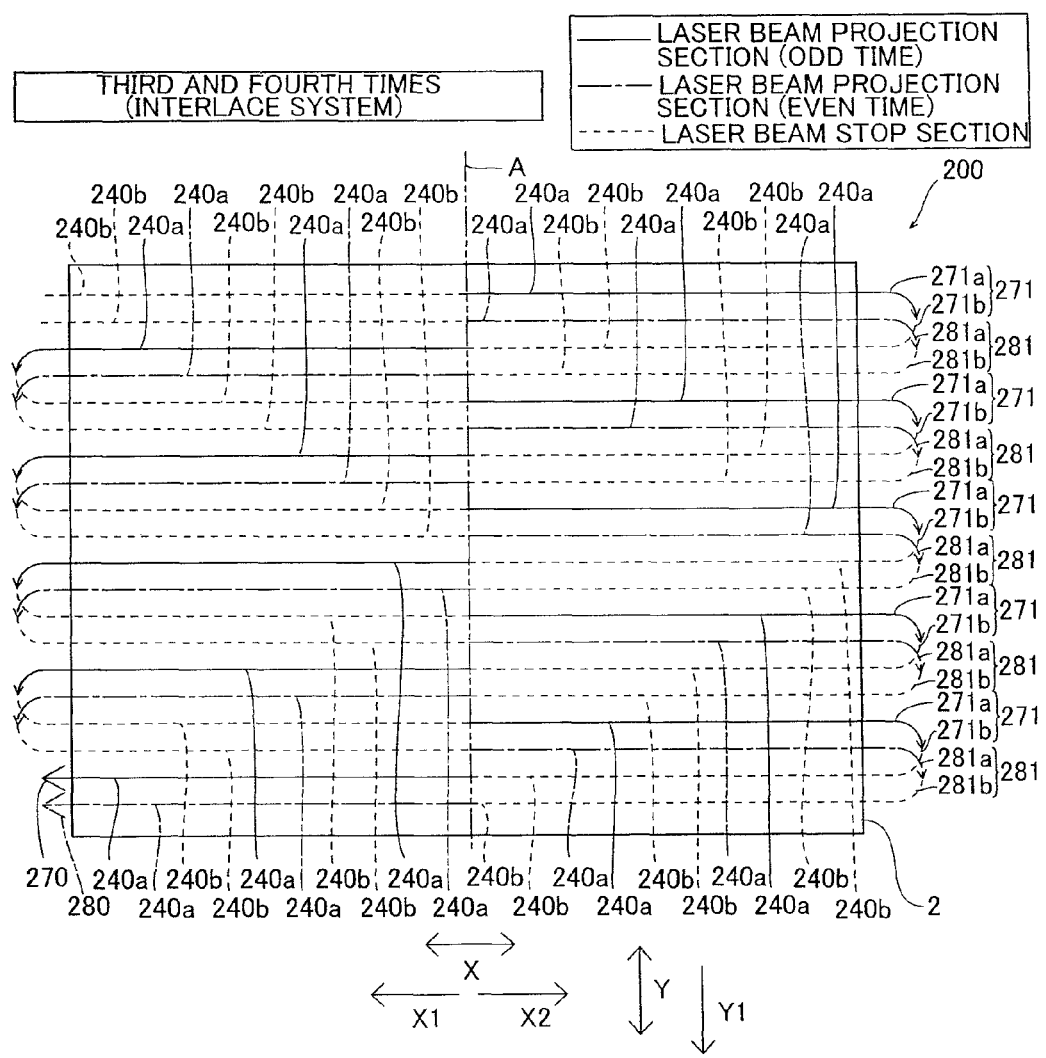
FIG. 12 illustrates third-time scanning and fourth-time scanning of the portable projector shown in FIG. 11.

According to the third embodiment, the portable projector 200 is so formed that the control portion 11 (see FIG. 2) controls the red/blue LD 12 (see FIG. 2) and the green LD 13 (see FIG. 2) not to emit the red, blue and green laser beams respectively in the first scanning section 270 from the end portion of the first forward path 271a of each of the plurality of first reciprocatory scanning sections 271 along arrow X1 to the centerline A in third-time scanning, as shown in FIG. 12. Thus, the portable projector 200 is so formed that the first scanning section 270 from the end portion of the first forward path 271a along arrow X1 to the centerline A becomes the laser beam stop section 240b due to nonprojection of the RGB laser beams. On the other hand, the portable projector 200 is so formed that the control portion 11 controls the red/blue LD 12 and the green LD 13 to emit the red, blue and green laser beams respectively in the first scanning section 270 from the centerline A to the end portion of the first forward path 271a of each of the plurality of first reciprocatory scanning sections 271 along arrow X2. Thus, the portable projector 200 is so formed that the first scanning section 270 from the centerline A to the end portion of the first forward path 271a along arrow X2 becomes the laser beam projection section 240a due to projection of the RGB laser beams.

Further, the portable projector 200 is so formed that the control portion 11 controls the red/blue LD 12 and the green LD 13 not to emit the red, blue and green laser beams respectively in the first scanning section 270 from the end portion of the first backward path 271b of each of the plurality of first reciprocatory scanning sections 271 along arrow X2 to the centerline A in third-time scanning. Thus, the portable projector 200 is so formed that the first scanning section 270 from the end portion of the first backward path 271b along arrow X2 to the centerline A becomes the laser beam stop section 240b due to nonprojection of the RGB laser beams. On the other hand, the portable projector 200 is so formed that the control portion 11 controls the red/blue LD 12 and the green LD 13 to emit the red, blue and green laser beams respectively in the first scanning section 270 from the centerline A to the end portion of the first backward path 271b of each of the plurality of first reciprocatory scanning sections 271 along arrow X1. Thus, the portable projector 200 is so formed that the first scanning section 270 from the centerline A to the end portion of the first backward path 271b along arrow X1 becomes the laser beam projection section 240a due to projection of the RGB laser beams. The third-time scanning is an example of the "second scanning" in the present invention.

According to the third embodiment, the portable projector 200 is so formed that the control portion 11 (see FIG. 2) controls the red/blue LD 12 (see FIG. 2) and the green LD 13 (see FIG. 2) not to emit the red, blue and green laser beams respectively in the second scanning section 280 from the end portion of the second forward path 281a of each of the plurality of second reciprocatory scanning sections 281 along arrow X1 to the centerline A in fourth-time scanning, as shown in FIG. 12. Thus, the portable projector 200 is so formed that the second scanning section 280 from the end portion of the second forward path 281a along arrow X1 to the centerline A becomes the laser beam stop section 240b due to nonprojection of the RGB laser beams. On the other hand, the portable projector 200 is so formed that the control portion 11 controls the red/blue LD 12 and the green LD 13 to emit the red, blue and green laser beams respectively in the second scanning section 280 from the centerline A to the end portion of the second forward path 281a of each of the plurality of second reciprocatory scanning sections 281 along arrow X2. Thus, the portable projector 200 is so formed that the second scanning section 280 from the centerline A to the end portion of the second forward path 281*a* along arrow X2 becomes the laser beam projection section 240*a* due to projection of the RGB laser beams.

Further, the portable projector 200 is so formed that the control portion 11 controls the red/blue LD 12 and the green LD 13 not to emit the red, blue and green laser beams respectively in the second scanning section 280 from the end portion of the second backward path 281*b* of each of the plurality of second reciprocatory scanning sections 281 along arrow X2 to the centerline A in the fourth-time scanning. Thus, the portable projector 200 is so formed that the second scanning section 280 from the end portion of the second backward path 281*b* along arrow X2 to the centerline A becomes the laser beam stop section 240*b* due to nonprojection of the RGB laser beams. On the other hand, the portable projector 200 is so formed that the control portion 11 controls the red/blue LD 12 and the green LD 13 to emit the red, blue and green laser beams respectively in the second scanning section 280 from the centerline A to the end portion of the second backward path 281*b* of each of the plurality of second reciprocatory scanning sections 281 along arrow X1. Thus, the portable projector 200 is so formed that the second scanning section 280 from the centerline A to the end portion of the second backward path 281*b* along arrow X1 becomes the laser beam projection section 240*a* due to projection of the RGB laser beams. The fourth-time scanning is an example of the "second scanning" in the present invention.

The portable projector 200 is so formed that the control portion 11 performs scanning similar to the first-time scanning shown in FIG. 11 in fifth-time scanning and performs scanning similar to the second-time scanning in sixth-time scanning. Further, the portable projector 200 is so formed that the control portion 11 performs scanning similar to the third-time scanning shown in FIG. 12 in seventh-time scanning and performs scanning similar to the fourth-time scanning in eighth-time scanning. In other words, the portable projector 200 is so formed that the control portion 11 repeats the aforementioned first-time scanning, the aforementioned second-time scanning, the aforementioned third-time scanning and the aforementioned fourth-time scanning as a set. The remaining structure of the third embodiment is similar to that of the aforementioned first embodiment.

According to the third embodiment, as hereinabove described, the portable projector 200 is so formed that the control portion 11 controls the red/blue LD 12 and the green LD 13 not to emit the red, blue and green laser beams respectively in the laser beam stop sections 240*b*, i.e., the first scanning section 270 from the centerline A to the end portion of the first forward path 271*a* of each of the plurality of first reciprocatory scanning sections 271 along arrow X2 and the first scanning section 270 from the centerline A to the end portion of the first backward path 271*b* of each of the plurality of first reciprocatory scanning sections 271 along arrow X1 in the first-time scanning and controls the red/blue LD 12 and the green LD 13 to emit the red, blue and green laser beams respectively in the laser beam projection sections 240*a*, i.e., the first scanning section 270 from the centerline A to the end portion of the first forward path 271*a* along arrow X2 and the first scanning section 270 from the centerline A to the end portion of the first backward path 271*b* along arrow X1 in the third-time scanning, whereby it is possible to compensate for the first scanning section 270 from the centerline A to the end portion of the first forward path 271*a* along arrow X2 and the first scanning section 270 from the centerline A to the end portion of the first backward path 271*b* along arrow X1, in which the control portion 11 has controlled the red/blue LD 12 and the green LD 13 not to emit the laser beams respectively in the first-time scanning, by controlling the red/blue LD 12 and the green LD 13 to emit the laser beams respectively in the subsequent third-time scanning for scanning the first scanning sections 270. Thus, the image projected on the projection region 2 can be further prevented from reduction in resolution resulting from the presence of the laser beam stop sections 240*b*, i.e., the first scanning section 270 from the centerline A to the end portion of the first forward path 271*a* along arrow X2 and the first scanning section 270 from the centerline A to the end portion of the first backward path 271*b* along arrow X1, in which the control portion 11 has controlled the red/blue LD 12 and the green LD 13 not to emit the laser beams.

According to the third embodiment, as hereinabove described, the portable projector 200 is so formed that the control portion 11 controls the red/blue LD 12 and the green LD 13 not to emit the red, blue and green laser beams respectively in the laser beam stop sections 240*b*, i.e., the first scanning section 270 from the end portion of the first forward path 271*a* along arrow X1 to the centerline A and the first scanning section 270 from the end portion of the first backward path 271*b* along arrow X2 to the centerline A in the third-time scanning, whereby the red/blue LD 12 and the green LD 13 can be inhibited from continuously emitting the laser beams, and can outwardly discharge heat, generated by the emission of the laser beams, in the laser beam stop sections 240*b* respectively.

According to the third embodiment, as hereinabove described, the portable projector 200 is so formed that the control portion 11 controls the red/blue LD 12 and the green LD 13 not to emit the red, blue and green laser beams respectively in the laser beam stop sections 240*b*, i.e., the second scanning section 280 from the centerline A to the end portion of the second forward path 281*a* of each of the plurality of second reciprocatory scanning sections 281 along arrow X2 and the second scanning section 280 from the centerline A to the end portion of the second backward path 281*b* of each of the plurality of second reciprocatory scanning sections 281 along arrow X1 in the second-time scanning and controls the red/blue LD 12 and the green LD 13 to emit the red, blue and green laser beams respectively in the laser beam projection sections 240*a*, i.e., the second scanning section 280 from the centerline A to the end portion of the second forward path 281*a* along arrow X2 and the second scanning section 280 from the centerline A to the end portion of the second backward path 281*b* along arrow X1 in the fourth-time scanning, whereby it is possible to compensate for the second scanning section 280 from the centerline A to the end portion of the second forward path 281*a* along arrow X2 and the second scanning section 280 from the centerline A to the end portion of the second backward path 281*b* along arrow X1, in which the control portion 11 has controlled the red/blue LD 12 and the green LD 13 not to emit the laser beams in the second-time scanning, by controlling the red/blue LD 12 and the green LD 13 to emit the laser beams respectively in the subsequent fourth-time scanning for scanning the second scanning sections 280. Thus, the image projected on the projection region 2 can be further prevented from reduction in resolution resulting from the presence of the laser beam stop sections 240*b*, i.e., the second scanning section 280 from the centerline A to the end portion of the second forward path 281*a* along arrow X2 and the second scanning section 280 from the centerline A to the end portion of the second backward path 281*b* along arrow X1, in which the control portion 11 has controlled the red/blue LD 12 and the green LD 13 not to emit the laser beams.

According to the third embodiment, as hereinabove described, the portable projector 200 is so formed that the control portion 11 controls the red/blue LD 12 and the green LD 13 not to emit the red, blue and green laser beams respectively in the laser beam stop sections 240b, i.e., the second scanning section 280 from the end portion of the second forward path 281a along arrow X1 to the centerline A and the second scanning section 280 from the end portion of the second backward path 281b along arrow X2 to the centerline A in the fourth-time scanning, whereby the red/blue LD 12 and the green LD 13 can be inhibited from continuously emitting the laser beams and can outwardly discharge the heat, generated by the emission of the laser beams, in the laser beam stop sections 240b respectively. The remaining effects of the third embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while each of the aforementioned first to third embodiments is applied to the portable projector 1, 100 or 200 as an exemplary projector, the present invention is not restricted to this, but is also applicable to another projector such as a floor type projector.

While the portable projector 1 or 100 scans the scanning section 30 formed by connecting the plurality of reciprocatory scanning sections 31 constituted of the forward paths 31a and the backward paths 31b with each other in each of the aforementioned first and second embodiments or the portable projector 200 scans the first scanning section 270 formed by connecting the plurality of first reciprocatory scanning sections 271 constituted of the first forward paths 271a and the first backward paths 271b with each other and the second scanning section 280 formed by connecting the plurality of second reciprocatory scanning sections 281 constituted of the second forward paths 281a and the second backward paths 281b with each other in the aforementioned third embodiment, the present invention is not restricted to this, but the scanning section may alternatively be formed by scanning only either forward paths or backward paths.

While the control portion 11 controls the red/blue LD 12 and the green LD 13 to emit the laser beams (in the laser beam projection sections 40a, 50a and 160a shown in FIGS. 6, 8 and 10 respectively) in the second-time scanning in the scanning sections 30 (the laser beam stop sections 40b, 50b and 160b shown in FIGS. 5, 7 and 9 respectively) in which the control portion 11 has controlled the red/blue LD 12 and the green LD 13 not to emit the laser beams respectively in the first-time scanning in the aforementioned first embodiment or the control portion 11 controls the red/blue LD 12 and the green LD 13 to emit the laser beams (in the laser beam projection sections 240a shown in FIG. 12) in the third-time scanning for subsequently scanning the first scanning sections 270 in the first scanning sections 270 (the laser beam stop sections 240b shown in FIG. 11) in which the control portion 11 has controlled the red/blue LD 12 and the green LD 13 not to emit the laser beams and controls the red/blue LD 12 and the green LD 13 to emit the laser beams (in the laser beam projection sections 240a shown in FIG. 12) in the fourth-time scanning for subsequently scanning the second scanning sections 280 in the second scanning sections 280 (the laser beam stop sections 240b shown in FIG. 11) in which the control portion 11 has controlled the red/blue LD 12 and the green LD 13 not to emit the laser beams respectively in the second-time scanning in the aforementioned third embodiment, the present invention is not restricted to this, but the portable projector may alternatively be so formed that the control portion 11 controls the red/blue LD 12 and the green LD 13 not to emit the laser beams also when the scanning section, in which the control portion 11 has controlled the red/blue LD 12 and the green LD 13 not to emit the laser beams in previous scanning, is subsequently scanned.

While the control portion 11 controls the red/blue LD 12 and the green LD 13 not to emit the laser beams (in the laser beam stop sections 40b, 50b and 160b shown in FIGS. 6, 8 and 10 respectively) in the subsequent second scanning in the scanning sections 30 (the laser beam projection sections 40a, 50a and 160a shown in FIGS. 5, 7 and 9 respectively) in which the control portion 11 has controlled the red/blue LD 12 and the green LD 13 to emit the laser beams respectively in the first-time scanning in the aforementioned first embodiment or the control portion 11 controls the red/blue LD 12 and the green LD 13 not to emit the laser beams (in the laser beam stop sections 240b shown in FIG. 12) in the third-time scanning for subsequently scanning the first scanning sections 270 in the first scanning sections 270 (the laser beam projection sections 240a shown in FIG. 11) in which the control portion 11 has controlled the red/blue LD 12 and the green LD 13 to emit the laser beams respectively in the first-time scanning and controls the red/blue LD 12 and the green LD 13 not to emit the laser beams (in the laser beam stop sections 240b shown in FIG. 12) in the third-time scanning for subsequently scanning the second scanning sections 280 in the scanning sections 280 (the laser beam projection sections 240a shown in FIG. 11) in which the control portion 11 has controlled the red/blue LD 12 and the green LD 13 to emit the laser beams respectively in the second-time scanning in the aforementioned third embodiment, the present invention is not restricted to this, but the portable projector may alternatively be so formed that the control portion 11 controls the red/blue LD 12 and the green LD 13 to emit the laser beams also when scanning sections, in which the control portion 11 has controlled the red/blue LD 12 and the green LD 13 to emit the laser beams in previous scanning, are subsequently scanned. In other words, the portable projector may be so formed that the laser beams superpose with each other in partial scanning sections.

While the control portion 11 switches the laser beam projection sections 40a, 160a or 240a and the laser beam stop sections 40b, 160b or 240b along the centerline A in the scanning section 30 in each of the aforementioned first to third embodiments and the control portion 11 switches the laser beam projection sections 50a and the laser beam stop sections 50b along the line B, the centerline A and the line C in the scanning section 30 in the aforementioned first embodiment, the present invention is not restricted to this, but the portable projector may alternatively be so formed that the control portion switches the laser beam projection sections and the laser beam stop sections on scanning positions other than the line B, the centerline A and the line C. For example, the portable projector may be so formed that the control portion switches the laser beam projection sections and the laser beam stop sections along two virtual lines in the scanning sections. Further, the control portion may not switch the laser beam projection sections and the laser beam stop sections to be at the same intervals in the scanning sections.

While the portable projector 1 is so formed that the control portion 11 switches the laser beam projection sections 50a and the laser beam stop sections 50b along the line B, the centerline A and the line C from the state where the control portion 11 has switched the laser beam projection sections 40a and the laser beam stop sections 40b along the centerline A when the state where the current supplied to the red/blue LD 12 and the green LD 13 is larger than the prescribed current value continues for the prescribed period in the aforementioned first embodiment, the present invention is not restricted to this, but the control portion may alternatively switch the laser beam projection sections and the laser beam stop sections on the basis of conditions other than the value of the supplied current and the time for supplying the current. Further alternatively, the portable projector may be so formed that the control portion switches the laser beam projection sections and the laser beam stop sections regardless of the time for supplying the current, if the current supplied to the red/blue LD and the green LD is larger than the prescribed current value.

While the portable projector 1 is so formed that the control portion 11 switches the laser beam projection sections 50a and the laser beam stop sections 50b along the line B, the centerline A and the line C from the state where the control portion 11 has switched the laser beam projection sections 40a and the laser beam stop sections 40b along the centerline A when the state where the current supplied to the red/blue LD 12 and the green LD 13 is larger than the prescribed current value continues for the prescribed period in the aforementioned first embodiment, the present invention is not restricted to this, but the portable projector may alternatively be so formed that the control portion switches the laser beam projection sections and the laser beam stop sections on scanning positions other than the line B, the centerline A and the line C from the state where the control portion 11 has switched the laser beam projection sections 40a and the laser beam stop sections 40b along the centerline A when the state where the supplied current is larger than the prescribed current value continues for the prescribed period if the control portion is formed to vary the number and the length of the laser beam stop sections with the magnitude of the current supplied to the red/blue LD and the green LD.

While the length L1 of the scanning section 30 from the end portion of each forward path 31a along arrow X1 to the centerline A and the length L2 of the scanning section 30 from the centerline A to the end portion of each forward path 31a along arrow X2 are substantially identical to each other and substantially half the lengths of the forward path 31a and the backward path 31b respectively in each of the aforementioned first and third embodiments, the present invention is not restricted to his, but the lengths L1 and L2 may not be substantially identical to each other, and may not be substantially half the lengths of the forward path and the backward path respectively.

While the portable projector 1 is so formed that the length L3 of the scanning section 30 from the end portion of each forward path 31a along arrow X1 to the line B, the length L4 of the scanning section 30 from the line B to the centerline A in each forward path 31a, the length L5 from the centerline A to the line C in each forward path 31a and the length L6 of the scanning section 30 from the line C to the end portion of each forward path 31a along arrow X2 are substantially identical to each other in the aforementioned first embodiment, the present invention is not restricted to this, but the lengths L3, L4, L5 and L6 may not be substantially identical to each other.

While the scanner mirror 15 which is the miniature vibrating mirror element having the vibration angle α is employed as a projecting portion in each of the aforementioned first to third embodiments, the present invention is not restricted to this. The projecting portion is not restricted to the vibrating mirror element, but may be formed by an element capable of scanning the projection region with the laser beams.

While the red/blue LD 12 and the green LD 13 are so employed as the laser beam emitting portion as to project the RGB laser beams onto the projection region 2 in each of the aforementioned first to third embodiments, the present invention is not restricted to this, but the laser beam emitting portion may alternatively be formed to emit RGB laser beams from a single LD. Further alternatively, the laser beam emitting portion may be formed to emit only a single-color laser beam, or may be formed to emit laser beams of two colors or at least four colors.

While the red/blue LD 12 capable of emitting the red and blue laser beams from a single LD is employed as the laser beam emitting portion in each of the aforementioned first to third embodiments, the present invention is not restricted to this, but a red LD emitting a red laser beam and a blue LD emitting a blue laser beam may be provided independently of each other.

While the portable projector 1, 100 or 200 is formed to project the image received from the personal computer 3 through the VGA terminal 10 on the projection region 2 in each of the aforementioned first to third embodiments, the present invention is not restricted to this, but the image projected on the projection region is not restricted to that received through a terminal. For example, the portable projector may be built into a personal computer, and may be formed to project an image received from the personal computer on a projection region. Further, the image projected on the projection region is not restricted to that received from the personal computer. For example, the portable projector may be formed to project an image stored in a memory card on the projection region through a card slot.

What is claimed is:

1. A projector comprising:
 a laser beam emitting portion emitting a laser beam;
 a projecting portion projecting an image on an arbitrary projection region by scanning said projection region with said laser beam; and
 a control portion controlling said laser beam emitting portion not to emit said laser beam by stopping supplying current continuously to said laser beam emitting portion during a previously set partial scanning section within a scanning section for said laser beam in said projection region.

2. The projector according to claim 1, wherein
 said scanning section includes a reciprocatory scanning section constituted of a forward path and a backward path, and
 said control portion is formed to control said laser beam emitting portion not to emit said laser beam by stopping supplying said current continuously to said laser beam emitting portion during said previously set partial scanning section of at least either said forward path or said backward path of said reciprocatory scanning section.

3. The projector according to claim 2, wherein
 said control portion is formed to control said laser beam emitting portion not to emit said laser beam by stopping supplying said current continuously to said laser beam emitting portion during both of said previously set partial scanning section of said forward path and said previously set partial scanning section of said backward path.

4. The projector according to claim 3, wherein
 the length of said previously set partial scanning section of said forward path and the length of said previously set partial scanning section of said backward path are substantially half the length of said forward path and substantially half the length of said backward path respectively.

5. The projector according to claim 2, wherein
said scanning section includes a plurality of said reciprocatory scanning sections, and
said control portion is formed to control said laser beam emitting portion not to emit said laser beam by stopping supplying said current continuously to said laser beam emitting portion during said previously set partial scanning section of at least either said forward path or said backward path in each of said plurality of reciprocatory scanning sections.

6. The projector according to claim 5, wherein
said control portion is formed to control said laser beam emitting portion not to emit said laser beam by stopping supplying said current continuously to said laser beam emitting portion during both of said previously set partial scanning section of said forward path and said previously set partial scanning section of said backward path in each of said plurality of reciprocatory scanning sections.

7. The projector according to claim 6, wherein
the length of said previously set partial scanning section of said forward path and the length of said previously set partial scanning section of said backward path are substantially half the length of said forward path and substantially half the length of said backward path respectively in each of said plurality of reciprocatory scanning sections.

8. The projector according to claim 2, wherein
said control portion is formed to switch a scanning section for emitting said laser beam and a scanning section for not emitting said laser beam in each of said forward path and said backward path at least through a centerline passing through a substantially central portion of said projection region and substantially orthogonal to said forward path and said backward path.

9. The projector according to claim 2, wherein
said control portion is formed to switch a scanning section for emitting said laser beam and a scanning section for not emitting said laser beam on a plurality of portions in at least either said forward path or said backward path of said reciprocatory scanning section.

10. The projector according to claim 9, wherein
the length of said scanning section for emitting said laser beam and the length of said scanning section for not emitting said laser beam are substantially identical to each other in at least either said forward path or said backward path of said reciprocatory scanning section.

11. The projector according to claim 2, wherein
said control portion is formed to switch a scanning section for controlling said laser beam emitting portion to emit said laser beam and a scanning section for controlling said laser beam emitting portion not to emit said laser beam in the vicinity of an end portion of said projection region which is the boundary between said forward path and said backward path so that either said forward path or said backward path is said scanning section for emitting said laser beam and either said backward path or said forward path is said scanning section for not emitting said laser beam.

12. The projector according to claim 1, further comprising a projector body including said laser beam emitting portion, said projecting portion and said control portion, wherein
said projector body consists of a portable projector body carried by a user.

13. The projector according to claim 12, wherein
said portable projector body is driven by a battery.

14. The projector according to claim 1, wherein
said projecting portion is formed to project said image on said projection region by repetitively scanning said projection region with said laser beam at a prescribed time interval,
said control portion is formed to control said laser beam emitting portion not to emit said laser beam by stopping supplying said current continuously to said laser beam emitting portion during said previously set partial scanning section within said scanning section for said laser beam in first scanning, and formed to control said laser beam emitting portion to emit said laser beam by supplying said current to said laser beam emitting portion in said scanning section, in which said control portion has controlled said laser beam emitting portion not to emit said laser beam in said first scanning, and to control said laser beam emitting portion not to emit said laser beam by stopping supplying said current continuously to said laser beam emitting portion in a scanning section different from said scanning section, in which said control portion has controlled said laser beam emitting portion not to emit said laser beam, in second scanning for scanning the same scanning section as that scanned in said first scanning subsequently to said first scanning, and
said control portion is formed to repeat said first scanning and said second scanning.

15. The projector according to claim 14, wherein
said projecting portion is formed to project said image on said projection region by repetitively scanning the same scanning section with said laser beam, and
said control portion is formed to control said laser beam emitting portion not to emit said laser beam in said previously set partial scanning section within said scanning section for said laser beam in first-time scanning as said first scanning, and formed to control said laser beam emitting portion to emit said laser beam in said scanning section, in which said control portion has controlled said laser beam emitting not to emit said laser beam in said first-time scanning, and to control said laser beam emitting portion not to emit said laser beam in a scanning section different from said scanning section, in which said control portion has controlled said laser beam emitting not to emit said laser beam, in second-time scanning as said second scanning.

16. The projector according to claim 15, wherein
said control portion is formed to control said laser beam emitting portion not to emit said laser beam in said previously set partial scanning section within said scanning section for said laser beam in odd-time scanning as said first scanning, and formed to control said laser beam emitting portion to emit said laser beam in said scanning section, in which said control portion has controlled said laser beam emitting portion not to emit said laser beam in said odd-time scanning, and to control said laser beam emitting portion not to emit said laser beam in a scanning section different from said scanning section, in which said control portion has controlled said laser beam emitting portion not to emit said laser beam, in even-time scanning as said second scanning.

17. The projector according to claim 14, wherein
said scanning section is constituted of a first scanning section corresponding to a prescribed region in said projection region and a second scanning section corresponding to a region, different from said first scanning section, in said projection region, said projecting portion is formed to project said image on said projection region by repeating an operation of scanning said first scanning section and said second scanning section as a set, and said control portion is formed to control said laser beam emitting portion not to emit said laser beam in a previously set partial scanning section within said first scanning section for said laser beam in first-time scanning as said first scanning, formed to control said laser beam emitting portion not to emit said laser beam in a previously set partial scanning section within said second scanning section for said laser beam in second-time scanning as said second scanning, formed to control said laser beam emitting portion to emit said laser beam in said scanning section, in which said control portion has controlled said laser beam emitting portion not to emit said laser beam in said first-time scanning, and to control said laser beam emitting portion not to emit said laser beam in a scanning section different from said scanning section, in which said control portion has controlled said laser beam emitting portion not to emit said laser beam, in third-time scanning as said second scanning, and formed to control said laser beam emitting portion to emit said laser beam in said scanning section, in which said control portion has controlled said laser beam emitting portion not to emit said laser beam in said second-time scanning, and to control said laser beam emitting portion not to emit said laser beam in a scanning section different from said scanning section, in which said control portion has controlled said laser beam emitting portion not to emit said laser beam, in fourth-time scanning as said second scanning, in a case of alternately repeating scanning of said first scanning section and scanning of said second scanning section.

18. The projector according to claim 1, wherein
said control portion is formed to vary the number of scanning sections for stopping supplying said current continuously to said laser beam emitting portion and to vary the length of each said scanning section in which said control portion has stopped supplying said current, in response to the magnitude of said current supplied to said laser beam emitting portion.

19. The projector according to claim 18, wherein
said control portion is formed to increase the number of said scanning sections for stopping supplying said current continuously to said laser beam emitting portion and to reduce the length of each said scanning section, in which said control portion has stopped supplying said current, when such a state that the value of said current supplied to said laser beam emitting portion is larger than a prescribed current value continues for a prescribed period.

20. The projector according to claim 1, wherein
said laser beam emitting portion includes a red laser beam emitting portion emitting a red laser beam, a blue laser beam emitting portion emitting a blue laser beam and a green laser beam emitting portion emitting a green laser beam, and said control portion is formed to control said red laser beam emitting portion, said blue laser beam emitting portion and said green laser beam emitting portion not to emit said red laser beam, said blue laser beam and said green laser beam respectively by stopping supplying said current continuously to each of said red laser beam emitting portion, said blue laser beam emitting portion and said green laser beam emitting portion in said previously set partial scanning section.

21. The projector according to claim 2, wherein
the length of said previously set partial scanning section of at least either said forward path or said backward path is substantially half the length of said forward path or said backward path.

* * * * *